United States Patent
Nakayama

(10) Patent No.: US 7,236,997 B2
(45) Date of Patent: Jun. 26, 2007

(54) FILTER PROCESSING APPARATUS AND METHOD

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 721 days.

(21) Appl. No.: 10/278,941

(22) Filed: Oct. 24, 2002

(65) Prior Publication Data

US 2003/0088598 A1 May 8, 2003

(30) Foreign Application Priority Data

Oct. 31, 2001 (JP) .............................. 2001-335185

(51) Int. Cl.
*G06F 17/10* (2006.01)
(52) U.S. Cl. ..................................... 708/300
(58) Field of Classification Search ................. 708/300
See application file for complete search history.

(56) References Cited

U.S. PATENT DOCUMENTS

| | | | |
|---|---|---|---|
| 5,581,373 A | 12/1996 | Yoshida | 358/476 |
| 5,748,786 A | 5/1998 | Zandi et al. | 382/240 |
| 5,796,828 A | 8/1998 | Tsukamoto et al. | 380/10 |
| 5,801,650 A | 9/1998 | Nakayama | 341/67 |
| 5,818,970 A | 10/1998 | Ishikawa et al. | 382/248 |
| 5,841,381 A | 11/1998 | Nakayama | 341/67 |
| 5,867,602 A | 2/1999 | Zandi et al. | 382/248 |
| 5,881,176 A | 3/1999 | Keith et al. | 382/248 |
| 5,966,465 A | 10/1999 | Keith et al. | 382/232 |
| 5,986,594 A | 11/1999 | Nakayama et al. | 341/107 |
| 6,141,446 A | 10/2000 | Boliek et al. | 382/233 |
| 6,195,465 B1 | 2/2001 | Zandi et al. | 382/248 |
| 6,222,941 B1 | 4/2001 | Zandi et al. | 382/232 |
| 6,229,927 B1 | 5/2001 | Schwartz | 382/248 |
| 6,408,102 B1 | 6/2002 | Nakayama | 382/246 |
| 6,549,666 B1 | 4/2003 | Schwartz | 382/233 |
| 2004/0022321 A1* | 2/2004 | Satoh et al. | 375/240.19 |

FOREIGN PATENT DOCUMENTS

| | | |
|---|---|---|
| JP | 09-027912 | 1/1997 |
| JP | 2000-059633 | 2/2000 |
| JP | 2001-077697 | 3/2001 |

* cited by examiner

*Primary Examiner*—Tan V. Mai
(74) *Attorney, Agent, or Firm*—Fitzpatrick, Cella, Harper & Scinto

(57) ABSTRACT

The present invention is applicable to a wavelet transform in JPEG 2000 and makes it possible to implement a convolution operation while reversibility is achieved. To this end, an implementation of a two-stage integer-type lifting operation shown in FIG. 28A is decomposed in the order of FIGS. 28B and 28C, and finally is separated into a real-number processing unit and integerizing processing unit as shown in FIG. 28C.

18 Claims, 30 Drawing Sheets

FIG. 3

| FILTER | FILTER COEFFICIENTS | |
|---|---|---|
| | FORWARD DIRECTION | REVERSE DIRECTION |
| 5/3 FILTER | H0=[−1/8, 1/4, 3/4, 1/4, −1/8] | G0=[−1/4, 1, −1/4] |
| | H1=[−1/2, 1, −1/2] | G1=[−1, 4, 6, 4, −1]/8 |

FIG. 4

| | LIFTING COEFFICIENTS |
|---|---|
| 5/3 FILTER | $p=(p0, p1)=(-1, -1)/2$ |
| | $u=(u0, u1)=(1, 1)/4$ |

F I G. 10A
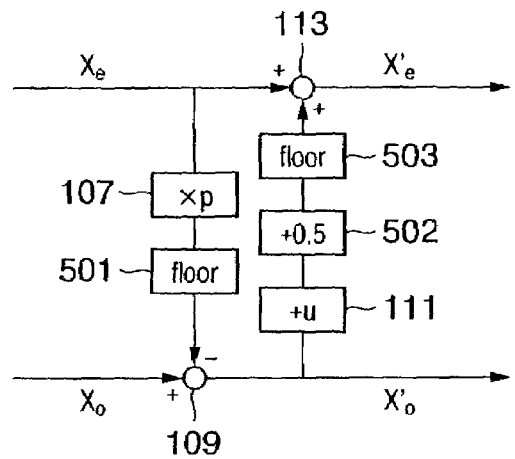
F I G. 10B
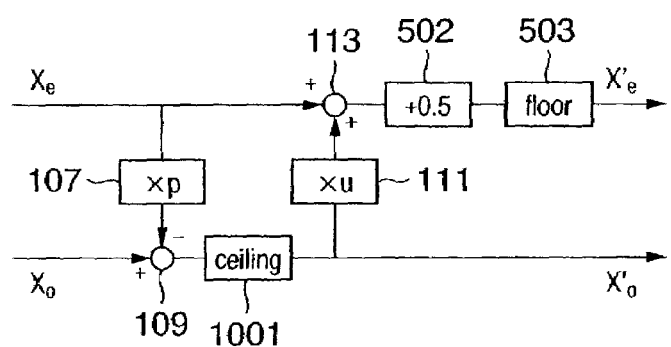
F I G. 10C
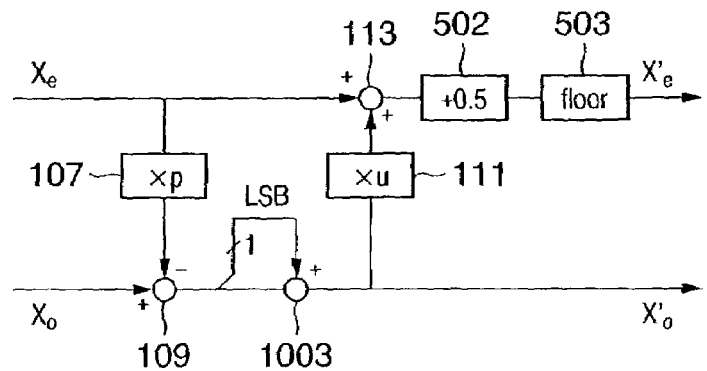

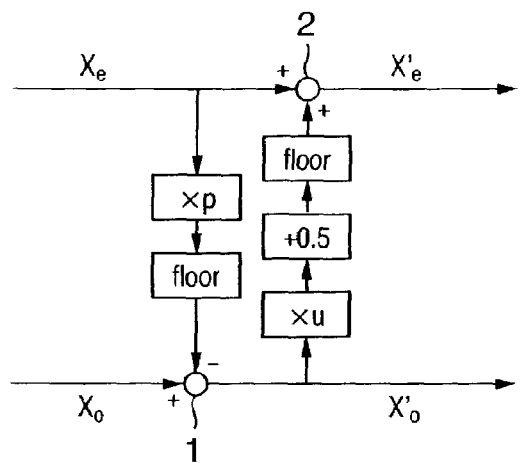
F I G. 28A
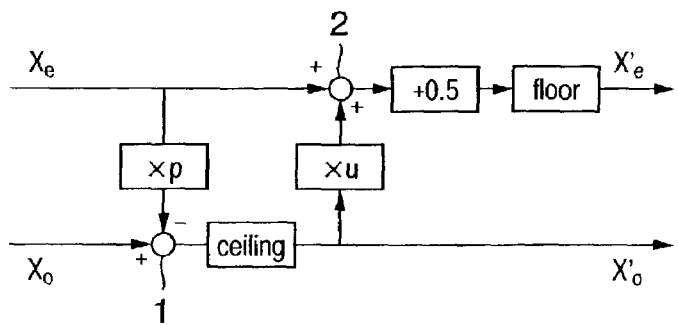
F I G. 28B
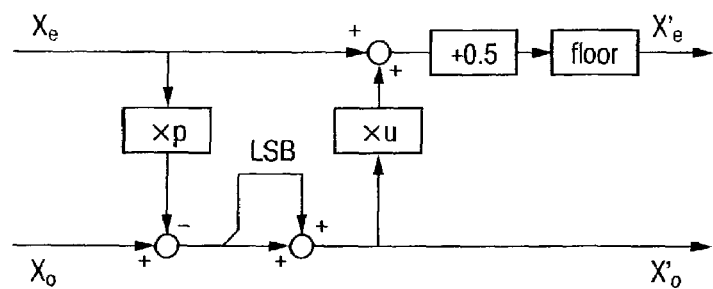
F I G. 28C
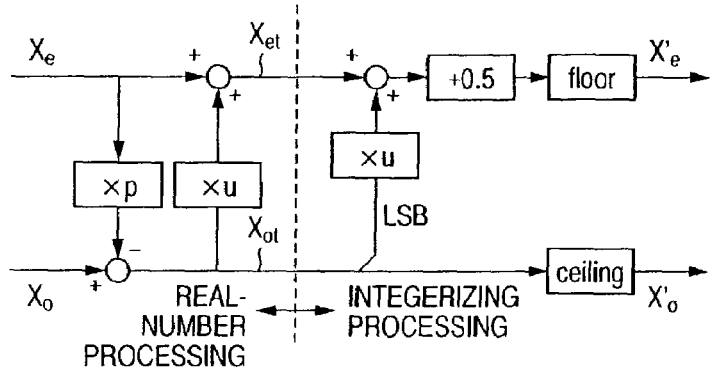
F I G. 28D

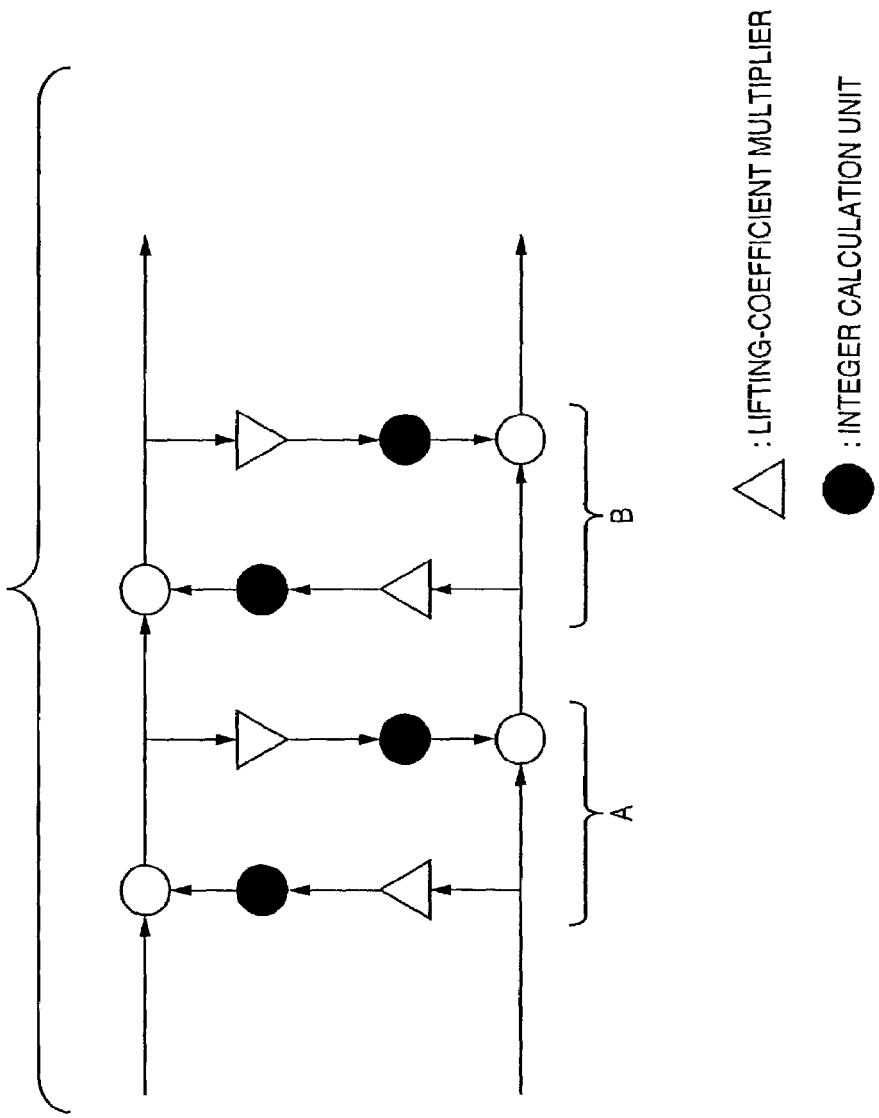

FILTER PROCESSING APPARATUS AND METHOD

FIELD OF THE INVENTION

This invention relates to a filter processing apparatus and to a filter processing methods.

BACKGROUND OF THE INVENTION

Images, especially multivalued images, contain a great amount of information that presents a problem when the images are stored and transmitted. At the time of such storage and transmission, therefore, use is made of highly efficient encoding that reduces the amount of information by eliminating image redundancy or altering the content of an image but only to such an extent that will not allow any decline in image quality to be readily distinguishable visually.

For example, with the JPEG scheme recommended by the ISO and ITU-T as an international standard for the encoding of still images, image data is converted to DCT (Direct Cosine Transform) coefficients by applying the DCT to the image data on a per-block (8×8 pixel) basis, the coefficients are quantized and then entropy encoding is applied to thereby compress the image data. Since the DCT and quantization is applied block by block, there are instances where so-called "block distortion" can be seen at the block boundaries in the decoded images.

JPEG 2000 is being considered as a new international standard for encoding still images. In JPEG 2000, a wavelet transform has been proposed as one type of pre-processing executed prior to quantization. With the wavelet transform, processing is not executed on a per-block basis as with the present JPEG scheme; rather, the input data is processing in continuous fashion. As a result, a feature of this approach is that degradation of the decoded image is not easy to recognize visually.

A discrete wavelet transform used in JPEG 2000 is positioned as filter processing means that divides image data into low- and high-frequency components. Filter processing usually is implemented by a convolution operation between filter coefficients and image data. However, a method based upon a lifting scheme can be applied, besides the convolution operation, to the following discrete wavelet transform used in JPEG 2000:

Daubecheis 9/7 Filter (referred to as a "9×7 filter" below")
Daubecheis 5/3 Filter (referred to as a "5×3 filter" below")
The lifting scheme will now be described.
<Description of Lifting Scheme>

FIG. 1 illustrates the basic implementation of a forward lifting scheme and FIG. 2 the basic implementation of a reverse lifting scheme. In FIG. 1, p and u are referred to as "lifting coefficients". FIG. 3 illustrates the filter coefficients of a 5×3 filter and FIG. 4 the lifting coefficients of the 5×3 filter.

The operation shown in FIG. 1 will be described based upon the lifting coefficients $p=(-1,-1)/2$ $u=(1,1)/4$ illustrated in FIG. 4.

In FIG. 1, X represents input image data, which enter in the order X0, X1, X2, X3, X4, X5 ..., as illustrated in FIG. 1. The data is classified into pixel data of an even-numbered sequence and pixel data of an odd-numbered sequence starting from the beginning of the input image.

The odd-sequence pixel data (X1, X3, X5, X7 ...) is generated by a downsampling unit 105, which downsamples the input image data every other pixel starting from the beginning of the data.

The even-sequence pixel data (X0, X2, X4, X6 ...) is generated by delaying the image data by one pixel using a delay unit 101 and then downsampling the single-pixel-delayed image data every other pixel using a downsampling unit 103.

Since the two downsampling units operate at the same timing, the pixel data of the two sequences having different downsampling phases can be generated by downsampling the data delayed by one pixel in the delay unit 101 and the undelayed input image data.

A multiplier 107 multiplies the even-sequence pixel data by the lifting coefficient p, and an adder 109 adds the product to the odd-sequence pixel data to calculate a transform coefficient X'o (X'1, X'3, X'5, X'7 ...) on the high-frequency side.

The processing for multiplying by the lifting coefficient and adding on the product is processing constituting a single unit in the lifting scheme and is referred to as a "lifting step".

The lifting coefficient p is vector data having two components. The pixel data of two successive even sequences is multiplied by each component (coefficient value), and the sum of the two products becomes the result of multiplication by the lifting coefficient p.

Multiplication by the lifting coefficient u in a multiplier 111 is performed in similar fashion. What is multiplied here is the just calculated transform coefficient X'o on the high-frequency side. The product is added to the pixel data of the even sequence by an adder 113, whereby a transform coefficient X'e (X'0, X'2, X'4, X'6 ...) on the low-frequency side is found.

If the above-described processing is expressed concretely in the form of equations, we have the following:

(transform coefficient on high-frequency side):

$$X'_{2n+1}=X2_{n+1}+(-X_{2n}-X_{2n+2})/2 \quad (1)$$

(transform coefficient on low-frequency side):

$$X'_{2n}=X_{2n}+(X'_{2n-1}+X'_{2n+1})/4 \quad (2)$$

The above processing is executed once in the horizontal direction and once in the vertical direction, and these two executions constitute one set. A discrete wavelet transform is implemented by repeating several sets of the above processing with regard to the low-frequency components. This is followed by performing quantization and entropy encoding to finally generate the encoded image data. On the decoding side, on the other hand, this processing is executed in reverse to reconstruct the original image.

A series of processing operations from the encoding side to the decoding side will now be described. To simplify the description, quantization and entropy encoding will be omitted. Further, let D represent the input image data, DWT the discrete wavelet transform, and IDWT an inverse discrete wavelet transform.

Processing is executed as follows:

$$D \rightarrow DWT \rightarrow IDWT \rightarrow D$$

This signifies how the original image D can be reconstructed. Specifically, the transformation process can be thought of as being reversible if viewed mathematically.

However, if this is packaged in the form of circuitry or software, "reversibility" is difficult to achieve. The reason is as follows:

An item of original image data generally is an integer. When the above-described filter processing is executed one time, however, data of floating-point type is obtained and the decimal fraction gives rise to, e.g., three bits. With two-dimensional filter processing, the processing is executed twice, namely once in the horizontal direction and once in the vertical direction, as mentioned above. This means that a 6-bit decimal fraction will be produced unless processing for rounding the decimal is executed during the course of filter processing. Furthermore, if filter processing is executed recursively again and again, the decimal fraction increases in proportion.

If a decimal fraction of six bits or more is left as is, the amount of data will increase. Usually, therefore, rounding is executed to obtain an integer and then the integer is saved. When image data is compressed, integerization or quantization is carried out so that the filtered data is reduced further.

Since information will be lost if the result of filter processing is rounded or quantized, data identical with the original image data will not be reconstructed even if filter processing in the reverse direction (processing on the decoding side) is executed. "Reversibility" will not be achieved, therefore, when the above is packaged in the form of circuitry or software.

The foregoing is filter processing in the forward direction. Processing in the reverse direction will now be described.

The reverse lifting scheme, which is shown in FIG. 2, employs processing that resembles that of the forward direction. If the processing is expressed in the form of equations, we have the following:

(pixels of even-numbered sequence):

$$X_{2n} = X_{2n} - (X'_{2n-1} + X'_{2n+1})/4 \quad (3)$$

(pixels of odd-numbered sequence):

$$X_{2n+1} = X'_{2n+1} - (-X_{2n} - X_{2n+2})/4 \quad (4)$$

This differs from processing in the forward direction in the following three points:

the order of the lifting coefficients used in the lifting step performed twice is reversed;

the result obtained by multiplication by the lifting coefficients is subtracted not added; and a zero-insertion unit is used after lifting instead of the downsampling unit.

Units 209 and 213 in FIG. 2 are subtractors for performing the above-mentioned subtraction, and units 203 and 205 are units for performing zero insertion.

Pixel data of the odd sequence that has undergone zero insertion is delayed one pixel by a delay unit 201 in order to achieve matching of phases. As a result, non-zero valid pixel data is obtained alternately from the sides of the even and odd sequences. Data that is the result of subjecting the original image data to forward and reverse filter processing can be obtained by combining the non-zero valid pixel data into a single sequence.

If the number of filter taps is changed, the number of lifting coefficients and the number of lifting step will change. With the 9×7 filter, for example, the lifting step is performed four times.

When the lifting scheme is used, the operation for the summing of products can be implemented fewer times in comparison with convolution processing. As a result, implementation is made more efficient and, moreover, an integer-type reversible transform, described below, becomes possible.

<Description of Reversible Transform>

As described above, the transform is reversible mathematically but is not necessarily reversible when packaged (referred to as "packaged reversibility" below). This will now be described in greater detail.

If broadly defined, a reversible transform is a transform whereby the original data can be reconstructed perfectly if transform coefficient data obtained by filter processing (transform processing) in the forward direction is subjected to filter processing in the reverse direction. This property of the reversible transform is referred to as "reversibility". A transform said to be reversible mathematically falls within the scope of this definition. More specifically, a transformation matrix is represented by a normal orthogonal matrix, as in a DCT, and there are filters in which the operation is performed by the above-described lifting scheme. In a broadly defined reversible transform, error accumulates owing to iteration processing if error is large at the time of real-number calculation, and therefore the original data may not be reconstructed even if the transform is performed in reverse. This means that computation bit length needs to be taken into consideration. In order to contrast the meaning of this with the integer-type reversible transform described below, the broadly defined reversible transform shall be referred to as a "real-number-type reversible transform" below.

In a real-number-type reversible transform, the overall amount of data (number of data items×bit length) that must be retained in order to possess reversibility increases. If the transform is executed recursively over and over, the amount of data increases until it is many times the amount of original data. In general, therefore, if transformation processing is executed for the purpose of data compression, reversibility is sacrificed and non-reversible compression is carried out. JPEG, H261, MPEG1/2/4, etc., which are employed in the compression of image data (still and moving images) are typical of such processing.

By contrast, an integer-type reversible transform is transform processing whereby the original data is reconstructed by reversible transform processing while the integers in data after execution of filter processing are identical with those of the input data. (There are also cases where if an input is fixed-point data, then the output also is the same fixed-point data.) This reversible transform is not one that can be implemented if the result of the above-mentioned real-number-type reversible transform is simply rounded to achieve integerization; it is a transform that can be implemented by executing the rounding processing for integerization in each lifting step, as will be described later. This shall be referred to as a "narrowly defined reversible transform". When the simple term "reversible transform" (reversible filter) is used below, this will indicate the narrowly defined reversible transform, namely the integer-type reversible transform.

In order to indicate that a certain transform is reversible, it is necessary to indicate the forward reversible transform and its corresponding reverse reversible transform in the form of a pair.

In order to implement reversible filter processing using the lifting scheme, rounding is executed in each lifting step, as mentioned above. More specifically, in each lifting step, rounding processing is executed before the result obtained by lifting-coefficient multiplication is added on or subtracted.

Reversibility will now be described taking a 5×3 filter that is capable of executing a reversible transform (this shall be referred to as a "reversible 5×3 filter") as an example. In order to render the description, FIG. 5 illustrates a processing system in which a reversible transform in the reverse direction is executed immediately after a reversible transform in the forward direction.

In FIG. 5, numerals 501, 503, 505, 507 represent floor-function arithmetic units for extracting an integer that will not exceed input data, and numerals 502, 504 denote adding units for adding 0.5 to data obtained by multiplication by lifting coefficients. The other units are exactly the same as those having like reference numerals used in FIGS. 1 and 2. Only integer data is inputted to the adders and subtractors in FIG. 5, and naturally the outputs thereof also are integer data. Such a lifting operation is referred to as "integer lifting" and is used to implement a reversible transform.

That the aforesaid filter processing (transform processing) is reversible will be demonstrated by describing that the result of processing image data (an integer), which has entered from the left side of FIG. 5, by a forward filter processor 540 and then processing the output of the processor 540 by a reverse filter processor 550 is exactly the same as the original input.

First, it should be noted that the inputs to the two adders and two subtractors in FIG. 5 are all integers, and that the outputs thereof also are integers.

The purpose of this description will be to indicate that an even-numbered pixel sequence and an odd-numbered pixel sequence before and after filter processing are equal to each other using a property (c) below after it is described that properties (a), (b) below hold true.

(a) The output of the floor-function arithmetic unit 503 in the forward filter processor 540 and the output of the floor-function arithmetic unit 505 in the reverse filter processor 550 are equal;

(b) the output of the floor-function arithmetic unit 501 in the forward filter processor 540 and the output of the floor-function arithmetic unit 507 in the reverse filter processor 550 are equal; and (c) if a value identical with that added is subtracted, then the original value that prevailed prior to addition will be reconstructed.

Multipliers 111 and 211 multiply by the same lifting coefficient u, and the data sequence that undergoes multiplication also is the same transform coefficient X'o on the high-frequency side. Accordingly, the outputs of these two multipliers are equal. The outputs have 0.5 added to them by the adding units 502, 504, respectively, and naturally the results obtained via the floor-function arithmetic units 503, 505 also are equal. Thus, it can be said that property (a) holds true. If property (c) is now utilized, it can be said that the even pixel sequence Xe input to the adder 113 and the even pixel sequence output from the subtractor 213 are equal.

Next, multipliers 102 and 207 also multiply by the same lifting coefficient p, and the data sequence that undergoes multiplication also is the above-mentioned even pixel sequence Xe. Accordingly, the outputs of these two multipliers are equal, and naturally the results obtained by processing these outputs by the floor-function arithmetic units 501, 507, respectively, also are equal. Thus, it can be said that property (b) holds true. If property (c) is now utilized, it can be said that the odd pixel sequence Xo input to the adder 109 and the odd pixel sequence output from the subtractor 209 are equal. As a result, the forward filter processor 540 and reverse filter processor 550 illustrated in FIG. 5 can be construed to be reversible.

The output of the forward filter processor 540 need not be subjected to rounding for integerization because it is already an integer; the output of this integer can be input directly to the reverse filter processor 550. If the quantization step is set to "1" by quantization processing used at the time of data compression, no information will be lost due to this quantization processing and, hence, reversible compression can be carried out. If the quantization step is set to be larger than "1", however, loss of information will occur. This means that although the compression rate rises, compression can no longer be performed reversibly.

A reversible transform is made possible by using the lifting scheme in the manner set forth above. The relationship between types of filters and computation techniques for implementing these filter may be summarized as follows:

filter processing with a finite impulse response can be implemented by a convolution operation;

some filter processing can be implemented by a lifting scheme (some cannot);

a real-number-type filter that can be implemented by the lifting scheme is capable of a reversible transform; and an integer-type reversible filter can be implemented by making the lifting operation one of the integer type in the above-mentioned real-number-type reversible filter.

Accordingly, though almost all filter processing can be realized by a convolution operation, integer-type reversible filter processing cannot be implemented using a convolution operation. This means that in a case where it is necessary to have both the function of filter processing, which cannot be implemented with the lifting scheme (it can only be implemented by a convolution operation), and the function of integer-type reversible filter processing, this must be realized by separate processors (circuits).

Further, since it is necessary to perform the integer-type lifting operation when integer-type reversible filter processing is executed, real-number-type filter processing cannot be executed at the same time and, hence, it is not possible to obtain the results of both integer-type and real-number-type filter processing at the same time.

Thus, as set forth above, reversible filter processing has not been achievable heretofore by using a convolution operation. Accordingly, if it is necessary to have both the function of filter processing, which can only be implemented by a convolution operation, and the function of reversible filter processing, separate processors (circuits) must be used, the filter processing apparatus is large in size and the apparatus cannot be constructed at low cost.

Further, integer-type reversible filter processing and real-number-type filter processing cannot be executed simultaneously and the results of both integer-type and real-number-type filter processing cannot be obtained simultaneously. In order to manufacture a chip having both these functions, two types of filters must be packaged in the chip.

SUMMARY OF THE INVENTION

Accordingly, an object of the present invention is to provide a filter processing apparatus and method applicable to a JPEG-2000-compliant wavelet transform or the like and implementable by a convolution operation while possessing reversibility, and to a computer program and storage medium for the same.

According to the present invention, the foregoing object is attained by providing a filter processing apparatus comprising filter processing means for performing a real-number-type filter operation in which a reversible transform is possible; means for generating correction data; and rounding processing means for integerization; whereby integer-type reversible filter processing is implemented.

Further, according to the present invention, the foregoing object is attained by providing a filter processing method comprising a filter processing step of performing a real-number-type filter operation in which a reversible transform is possible; a step of generating correction data; and a rounding processing step for performing integerization; whereby integer-type reversible filter processing is implemented.

Further, according to the present invention, the foregoing object is attained by providing a filter processing apparatus comprising first lifting operation means for performing a real-number-type filter operation in which a reversible transform is possible; and second lifting operation means for converting real-number data, which is output from the first lifting operation means, to integral data; whereby integer-type reversible filter processing is implemented.

Further, according to the present invention, the foregoing object is attained by providing a filter processing method comprising a first lifting operation step of performing a real-number-type filter operation in which a reversible transform is possible; and a second lifting operation step of converting real-number data, which is obtained at the first lifting operation step, to integral data; whereby integer-type reversible filter processing is implemented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating the coefficients of a 5×3 filter;

FIG. 4 is a diagram illustrating the lifting coefficients of the 5×3 filter;

FIG. 10A is a diagram showing the structure of a lifting unit of an integer-type reversible 5×3 filter, and FIGS. 10B and 10C are diagrams illustrating examples of modifications equivalent to this structure;

FIGS. 28A to 28D are transitional diagrams for introducing the integer-type lifting operation of FIG. 27 to an implementation of the present invention;

FIG. 29 is a diagram illustrating implementation of four-stage lifting; and

DESCRIPTION OF THE PREFERRED EMBODIMENTS

Preferred embodiments of the present invention will be described in accordance with the accompanying drawings. The basic components will be described first.

The basic concept of the present invention will be described with reference to FIG. 27, which is a conceptual view (of integer-type lifting) illustrating the encoding and decoding sides of an integer-type lifting unit. To simplify the description, it will be assumed that the quantization step in FIG. 27 is "1" (which is equivalent to a case where quantization is not carried out), and components relating to entropy encoding and decoding are deleted.

Figure 27:
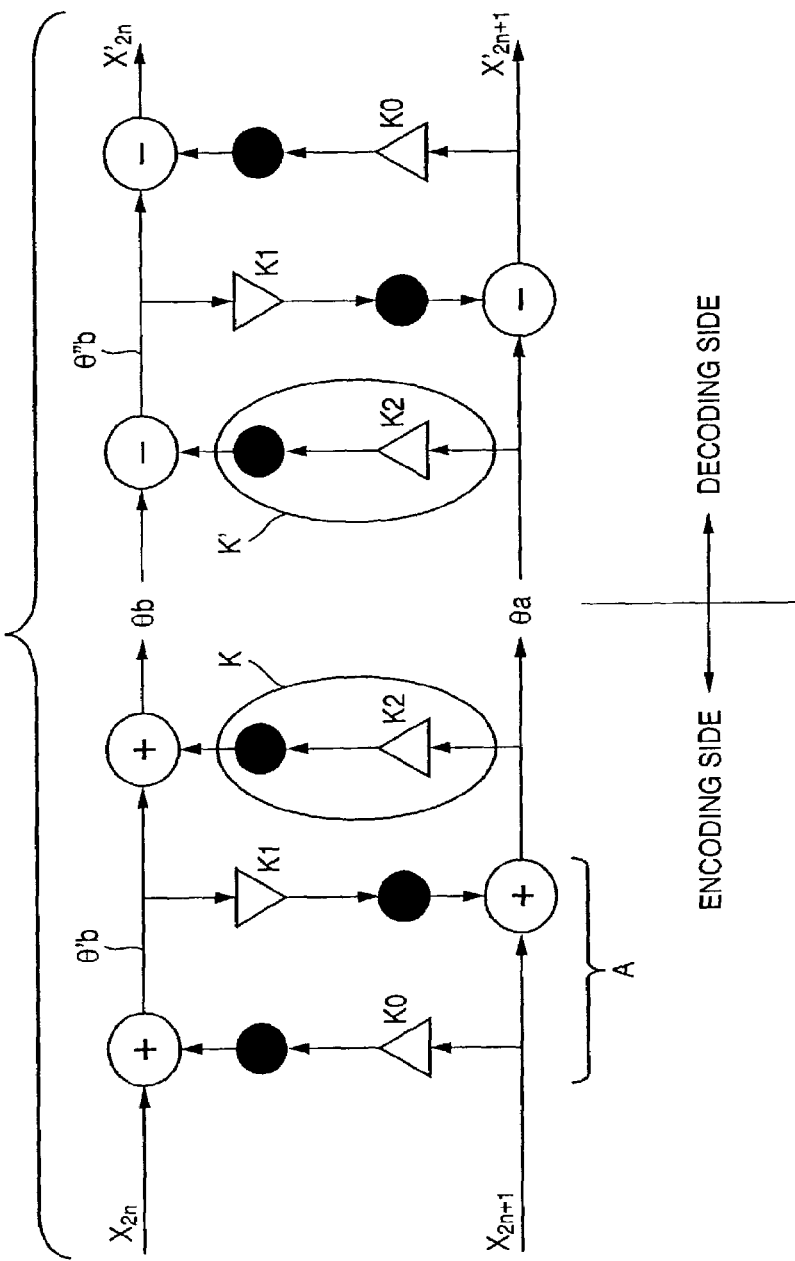
FIG. 27 is a block diagram illustrating an integer-type lifting operation.

In FIG. 27, $X_{2n}$, $X_{2n+1}$ represent multivalued image data (e.g., 8-bit integer pixel data). If the input pixel data in the horizontal direction is expressed by $X_0$, $X_1$, $X_2$, $X_3$, $X_4$ . . . , the $X_{2n}$ indicates even-numbered pixel data $X_0$, $X_2$, $X_4$ . . . and the pixel data is input in the order mentioned. Further, $X_{2n+1}$ indicate odd-numbered pixel data $X_1$, $X_3$, $X_5$ . . . , and the pixel data is input in the order mentioned. Such an input is generated by downsampling processing.

Consider an output θb on the encoding side in FIG. 27. A certain value $θb_n$ of this θb is equivalent to one calculated as follows:

$$θb_n = θ'b + \text{integerization}\ [k_0 \times (θa_{2n-1} + θa_{2n+1})]$$

What is noteworthy here is that θ'b also has been calculated by similar rounding and therefore is an integer. In other words, regardless of what the lifting coefficient is, the value is retained as an integer by subsequently applying rounding (integerization).

On the decoding side, processing is executed in an order that is exactly the reverse of that of the processing executed on the encoding side. Consider θ"b on the decoding side. This θ"b is a value that is the result of subtracting a value calculated by a lifting operation K' from θb. However, the lifting operation K' has an operational value with respect to the common θa in a manner exactly the same as that of lifting operation K on the encoding side. That is, since what has been added is merely subtracted, it will be appreciated that θ'b on the encoding side is exactly equal to θ"b on the encoding side. It will be understood that this will hold true regardless of a lifting coefficient K2.

The foregoing is a description regarding θb, but the same can be said to hold true for θa. More specifically, output data (an integer) generated by a single lifting operation can always be made reversible. The foregoing is the constitution of a filter based upon an integer-type lifting operation.

Next, consider an arrangement of the kind shown in FIG. 28A as a model of the integer-type lifting operation. FIG. 28A illustrates an example constituted by two lifting operation units (a two-stage lifting operation unit). Let Xe, Xo represent input signal (data) sequences, and let X'e, X'o represent signal (data) sequences output as the result of these two operations. It goes without saying that each item of data in these signal sequences Xe, Xo, X'e and X'o is an integer.

Though the lifting coefficients are p, u, a 5×3 filter will be described as an example of the filter type in JPEG 2000. Accordingly, the lifting coefficient p will be described as being $-(p_0, p_1) = -(½, ½)$ and the lifting coefficient u will be described as being $(u_0, u_1) = (¼, ¼)$.

If the meaning of FIG. 28A is indicated by equations, we have the following:

$$X'o_n = Xo_n - \text{floor}(p_0 \cdot Xe_{n-1} + p_1 \cdot Xe_{n+1})$$

$$X'e_n = Xe_n + \text{floor}(u_0 \cdot X'o_{n-1} + u_1 \cdot X'o_{n+1} + 0.5)$$

where floor(x) represents a function (or circuit) that returns the largest integer that will not exceed x.

FIG. 28B shows a circuit implementation that is equivalent to FIG. 28A. In FIG. 28B, ceiling(x) represents a function (or circuit) that returns the smallest integer that will be greater than or equal to x. The reason why FIGS. 28A and 28B are equivalent is as follows:

First, consider the output of an arithmetic unit 1.

In FIG. 28A, X'o indicates that the result of applying the floor operation to the result of multiplying Xe by the lifting coefficient p is subtracted from the input data Xo (note that this is an integer). The floor operation, therefore, acts in a direction that diminishes the value subtracted from the data Xo. In other words, the floor operation in this case acts in a direction that enlarges the result of subtraction (the output of arithmetic unit 1).

Accordingly, owing to the ceiling operation (and its position) in FIG. 28B, the substance of this operation is equivalent to FIG. 28B.

The above is easier to understand if the relationship between FIG. 28A and FIG. 28B is expressed as follows:

integer−floor(real number)=ceiling (integer−real number).

Next, consider the output of an arithmetic unit 2 in FIG. 28A. If the substance of the operation performed by the arithmetic unit 2 is expressed in simple terms, we have the following:

integer+floor(real number+0.5)

This can be expressed as follows:

floor[(integer+real number)+0.5]

FIG. 28B expresses this exactly.

On the basis of the foregoing, it can be understood that FIG. 28A and FIG. 28B represent equivalent circuit implementations.

Next, consider a case where the ceiling operation of FIG. 28B is packaged.

The ceiling operation rounds up fractions below the decimal point. In this case, the information below the decimal point is only one bit of the first decimal place, and this one bit is the least significant bit of the output from the arithmetic unit 1. Accordingly, it will suffice to add this least significant bit to the output value of arithmetic unit 1. Alternatively, the same result can be obtained by adding this to a value (higher order integer) from which the least significant bit is excluded.

This is expressed by FIG. 28C. FIG. 28C is equivalent to FIG. 28B and, further, to FIG. 28A.

Furthermore, considering the calculation coefficient u of FIG. 28C, it will be understood that a change can be made as shown in FIG. 28D in accordance with the distributive law.

With regard to FIG. 28D, the left side of the dashed line represents real-number processing, namely a real-number-type lifting operation, and the right side of the dashed line represents integerization processing. That is, by adopting the arrangement of FIG. 28(D), the integer-type lifting operation need not be used and implementation can be achieved by real-number-type lifting (an operation without rounding) and integerization.

The arrangement of FIG. 28D may be summarized as set forth below. It should be noted that the output values (temporary output values) in the real-number-type lifting unit are expressed by Xet, Xot, as illustrated.

The real-number-type lifting unit performs the following processing $$Xot_{2n+1} = Xo_{2n+1} - (Xe_{2n} + Xe_{2n+2}) \times ½$$

$$Xet_{2n} = Xe_{2n} - (Xot_{2n-1} + Xot_{2n+1}) \times ¼$$

The above equations are none other than a real-number-type lifting operation from which integerization (floor) in the basic arrangement of FIG. 28A has been excluded. The processing in the ensuing integerization operation integerizes the result of the operation indicated by these equations. In wording easier to understand, the above is nothing other than application of a correction to the above result of calculation so as to obtain the equivalent of integerization of each of the second terms "$(Xe_{2n} + Xe_{2n+2}) \times ½$" and "$(Xot_{2n-1} + Xot_{2n+1}) \times ¼$" in the above equations.

As shown in FIG. 28D, the real-number lifting operation can be implemented (packaged) by a convolution operation, and it will suffice to perform integerization thereafter. This means that implementation can be achieved by a very simple arrangement.

The above example is one in which the two-stage integer-type lifting operation is divided into two-stage real-numbertype lifting and the succeeding integerization. For example, a four-stage integer-type lifting operation can be expressed as shown in FIG. 29. This arrangement can be considered to be obtained by cascade-connecting two two-stage integer-type lifting operations A and B. It is evident, therefore, that each can be separated into the above-described implementations. The same is true for six stages and eight stages.

Further, with regard also to integer-type lifting on the decoding side, it can readily be understood that the operation can be divided into real-number-type lifting and integerization by the same concept, and this will hold true also for four stages, six stages and so forth. Specific examples will now be described in the form of embodiments of the invention.

First Embodiment

In a first embodiment of the present invention, a real-number-type filter operation capable of a reversible transform is performed by a convolution operation.

Figure 6A:
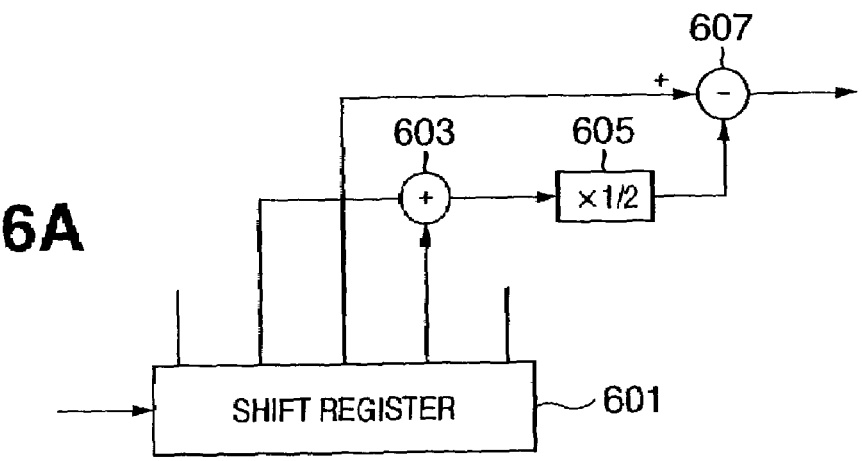
FIGS. 6A and 6B are diagrams illustrating implementations for calculating high-frequency transform coefficients and low-frequency transform coefficients, respectively, by a convolution operation.
Figure 6B:
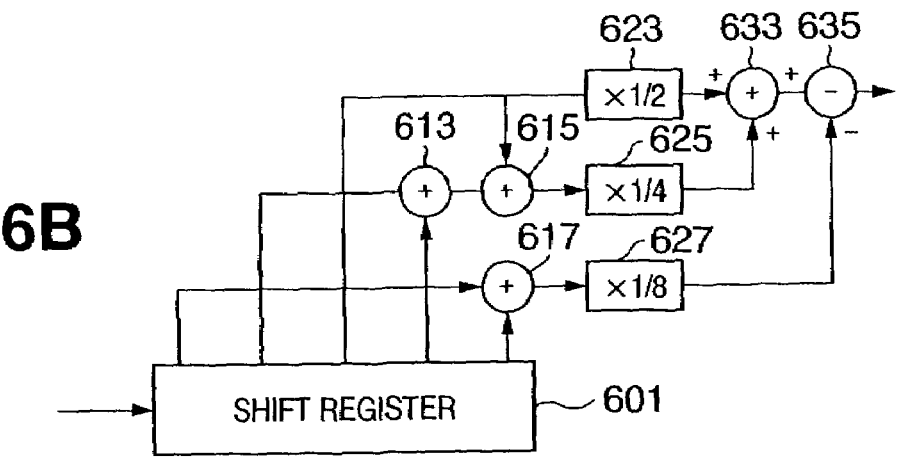
Figure 7:
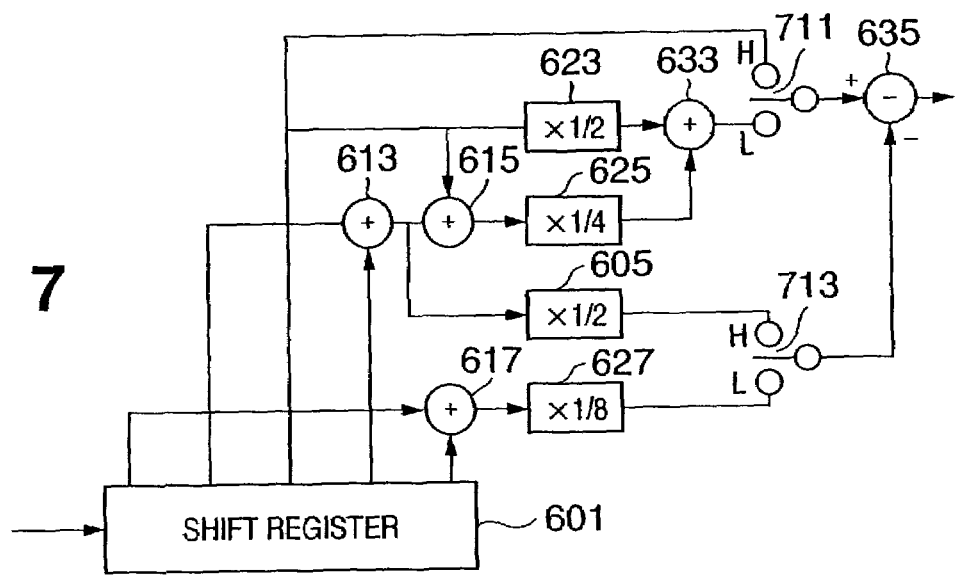
FIG. 7 is a diagram illustrating an implementation for selectively calculating high- and low-frequency transform coefficients by a convolution operation.

A hardware implementation for realizing the above-mentioned 5×3 filter by a convolution operation is as shown in FIG. 7. Since this arrangement alternately outputs high- and low-frequency transform coefficients that are output by the 5×3 filter, the structure is somewhat complicated. Accordingly, the components for calculating only the low-frequency transform coefficients are illustrated in FIG. 6A, the components for calculating only the high-frequency transform coefficients are illustrated in FIG. 6B, and the arrangement of FIG. 7 will be described after FIGS. 6A and 6B are described.

Since the arrangements of FIGS. 6A, 6B indicate well-known technical content that can be implemented easily from the filter coefficients of FIG. 3, these arrangements will be described in simple terms.

In FIGS. 6A and 6B, a shift register 601 is for extracting, in parallel, five items of data for filter processing. Numerals 603, 613, 615, 617 and 633 denote adders and numerals 605, 623, 625, 627 denote multipliers for multiplying by coefficients (since the coefficients are powers of 2, in actuality the multiplication can be implemented by a bit shift). Numerals 607, 635 denote subtractors.

Assume that the input to the shift register 601 is 8-bit integer data (pixel data).

In FIG. 6A, a high-frequency transform coefficient is calculated using only three of the five items of data output from the shift register 601. Two items of data for which the filter coefficient is $-\frac{1}{2}$ are first added together in the adder 603, the sum is then multiplied by $\frac{1}{2}$ in the multiplier 605 and the product is inputted to the subtractor 607. On the other hand, the central data for which the filter coefficient is 1 is inputted directly to the subtractor 607. By virtue of this arrangement, a filter operation whose filter coefficients are $[-\frac{1}{2}, 1, -\frac{1}{2}]$ is implemented.

In FIG. 6B, all five items of data output from the shift register 601 are used in calculation. The result of multiplying the central data, whose filter coefficient is $\frac{3}{4}$, by $\frac{1}{2}$ in the multiplier 623, and the result of multiplying the output of the adder 615 by $\frac{1}{4}$ in the multiplier 625, are added by the adder 633, thereby implementing multiplication by $\frac{3}{4}$. Two items of data for which the filter coefficient is $\frac{1}{4}$ are added by the adder 613, the sum is inputted to the adder 615 and this output is multiplied by $\frac{1}{4}$ in the multiplier 625. Two items of data for which the filter coefficient is $\frac{1}{8}$ are added by the adder 617, the sum is multiplied by the coefficient $\frac{1}{8}$ in multiplier 627 and then the product is inputted to the subtractor 635. A filter having filter coefficients $[-\frac{1}{8}, \frac{1}{4}, \frac{3}{4}, \frac{1}{4}, -\frac{1}{8}]$ is implemented by these operations. Since the output data following these operations is such that the positive range broadens and, moreover, values become negative, an increase of one bit for the sign and one bit for the integral part exclusive of the sign occurs and 3-bit information becomes attached below the decimal point.

The arrangement of FIG. 7 is obtained by combining FIGS. 6A and 6B and outputs high- and low-frequency transform coefficients alternatingly every cycle. Accordingly, the units that constitute FIG. 7 basically are identical with the units that constitute FIGS. 6A and 6B; some are shared and some are added on. The units added on are selectors 711 and 713, and the shared units are the adders 603, 613 and subtractors 607, 635, with the adder 613 and the subtractor 635 being used in FIG. 7.

A clock for inputting the image data (logical high and low levels can be assigned to even- and odd-numbered pixel data, respectively, by performing frequency division by two) is supplied to the selectors 711 and 713. A high-frequency transform coefficient is output when each selector is switched to a terminal on the H side, and a low-frequency transform coefficient is outputted when each selector is switched to a terminal on the L side. The form of the output data is ten bits for the sign and integral part and three bits for the decimal part.

Figure 9:
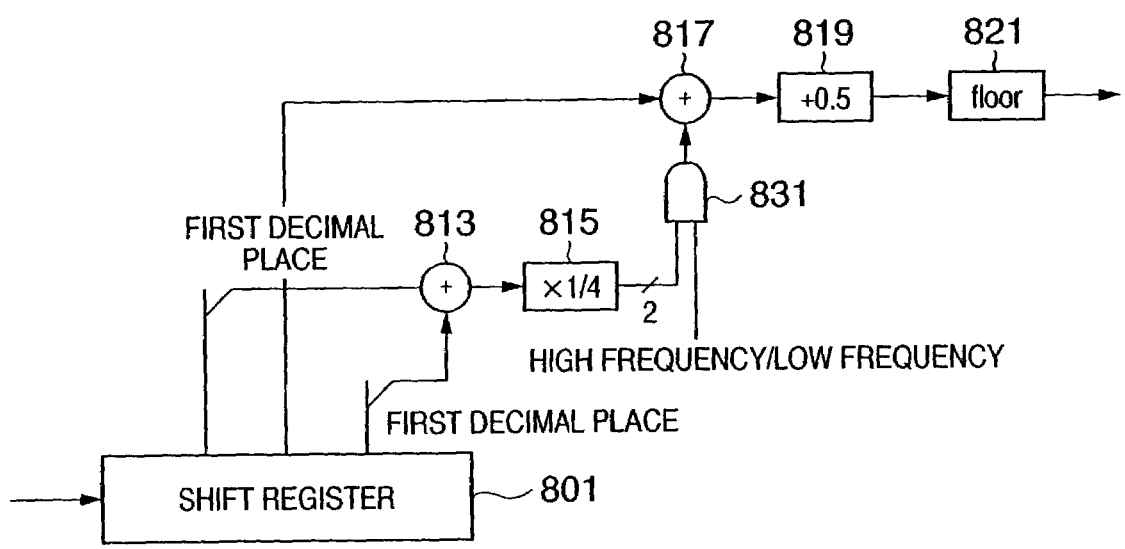
FIG. 9 is a diagram illustrating the structure of a first embodiment of the present invention.

The data obtained from the above arrangement, which is one mode of performing a real-number-type filter operation that is capable of a reversible transform, is converted to the result of integer-type filter processing, in which a reversible transform is possible, by a correction data generator and integerizing rounding unit shown in FIG. 9, thereby making it possible to implement a circuit that is equivalent to FIG. 28D.

The description of FIG. 9 will be rendered upon dividing FIG. 9 into processing of high-frequency transform coefficients and low-frequency transform coefficients in a manner similar to that of FIG. 7.

Figure 8A:
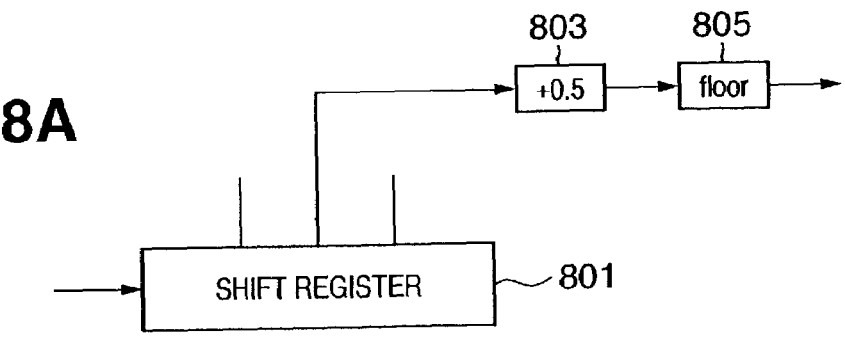
FIGS. 8A and 8B are diagrams respectively illustrating implementations for integerizing high- and low-frequency transform coefficients obtained by fixed-point calculation.
Figure 8B:
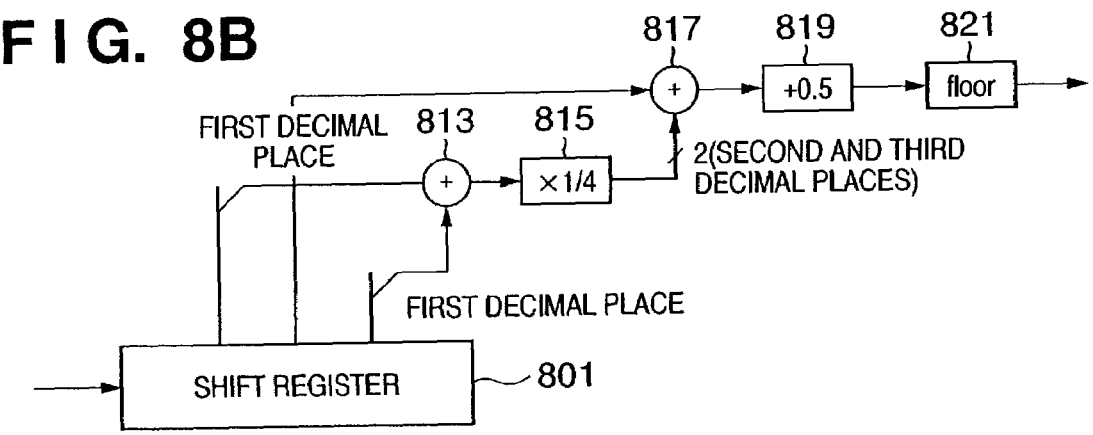

In FIGS. 8A and 8B, use is made of a shift register 801 for extracting, in parallel, three items of data composed of the sign and integral part (ten bits) and decimal part (three bits). Processing of high-frequency transform coefficients shown in FIG. 8A is performed at the timing at which the center of the three items of data output from the shift register 801 becomes a high-frequency transform coefficient (real-valued).

In FIG. 8A, 0.5 is added only to the central item of data by an adder 803, and a floor-function arithmetic unit 805 finds and outputs the largest integer that will not exceed the result of addition. This output is an integerized high-frequency transform coefficient.

The processing of low-frequency transform coefficients shown in FIG. 8B is performed at the timing at which the center of the three items of data output from the shift register 801 becomes a low-frequency transform coefficient (real-valued).

Only the bit of the first decimal place is extracted from each of the high-frequency transform coefficients on both sides of the low-frequency transform coefficient, and the bits are added as positive values by an adder 813. The result of this addition is a positive number composed of a 1-bit integral part and 1-bit decimal part. The result is multiplied by the coefficient $\frac{1}{4}$ in a multiplier 815, whereby a conversion is made to data of second and third decimal places. This data is added to the low-frequency transform coefficient (real-valued) as correction data in an adder 817. An adder 819 adds 0.5 to this sum, and a floor-function arithmetic unit 821 finds and outputs the largest integer that will not exceed this result addition. This output is an integerized low-frequency transform coefficient.

The arrangement of FIG. 9 is obtained by combining the functions of FIGS. 8A and 8B and outputs integer high- and low-frequency transform coefficients alternatingly every cycle. Accordingly, the units that constitute FIG. 9 basically are identical with the units that constitute FIGS. 8A and 8B; some are shared and some are added on. The shared units are the adders 803, 819 and the floor-function arithmetic units 805, 821, and the unit added on is a gate unit 831. Control is exercised in such a manner that the correction data is validated when a low-frequency transform coefficient is output and is masked and invalidated when a high-frequency transform coefficient is output.

Thus, as described above, a reversible filter processing apparatus capable of a reversible transform can be constructed, without using an integer-type lifting operation, by a real-number-type filter processor (FIG. 7) that is capable of a reversible transform and a processor (FIG. 9) for generating correction data from the result of processing by this filter processor, adding on the correction data and then executing rounding in order to achieve integerization.

The reason why filter processing capable of a reversible transform can be performed by the above arrangement will become evident from a second embodiment described next.

Second Embodiment

In the second embodiment, a real-number-type filter operation capable of a reversible transform is performed using a lifting scheme. In order to describe reversibility inclusive of the first embodiment, the description starts from the forward filter processor 540 shown in FIG. 5 and the arrangement is modified little by little to derive the method that implements this embodiment. Since part of the description overlaps the description of FIG. 28, this part of the description will be rendered again.

Figure 1:
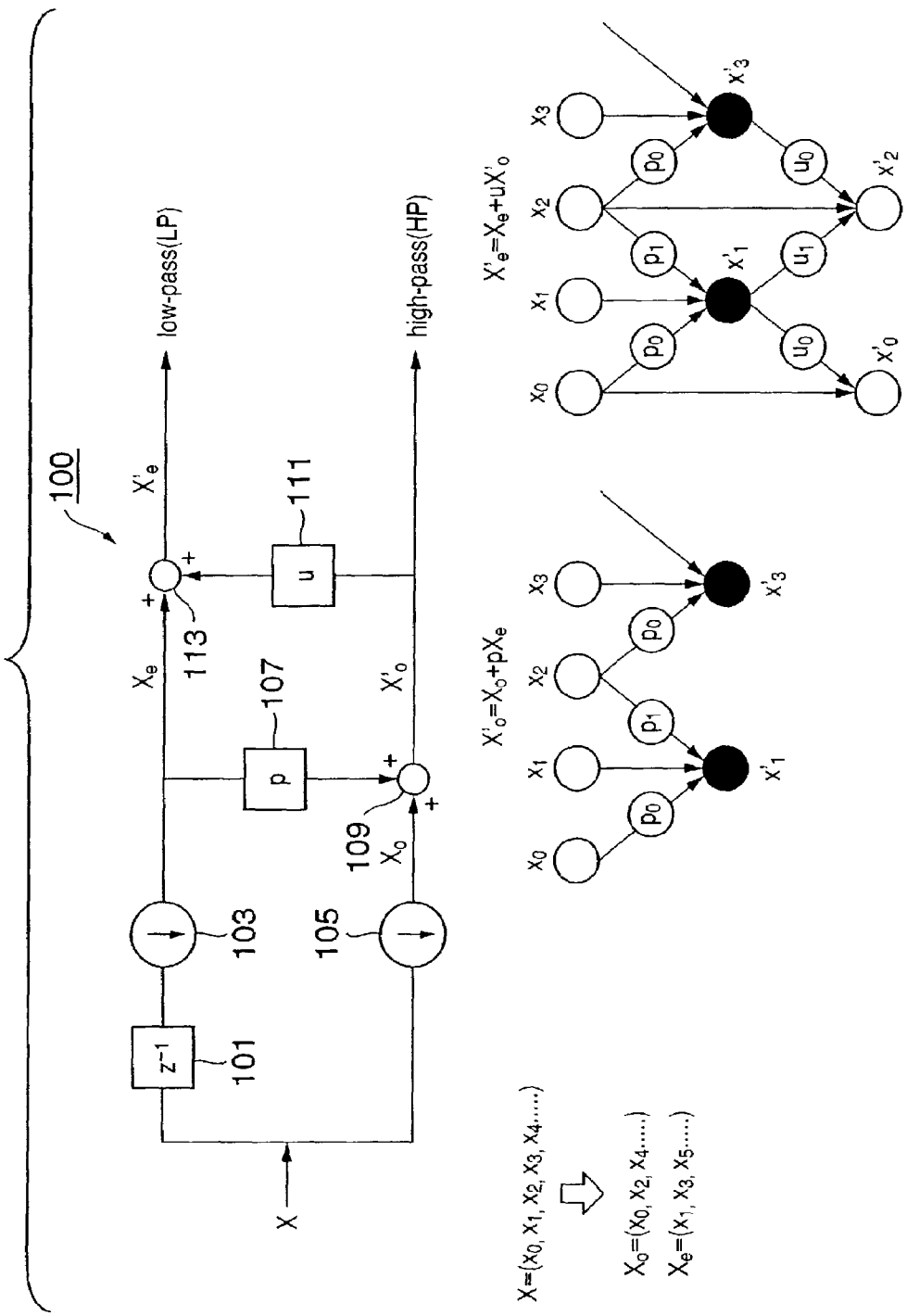
FIG. 1 is a diagram representing a forward lifting scheme.
Figure 2:
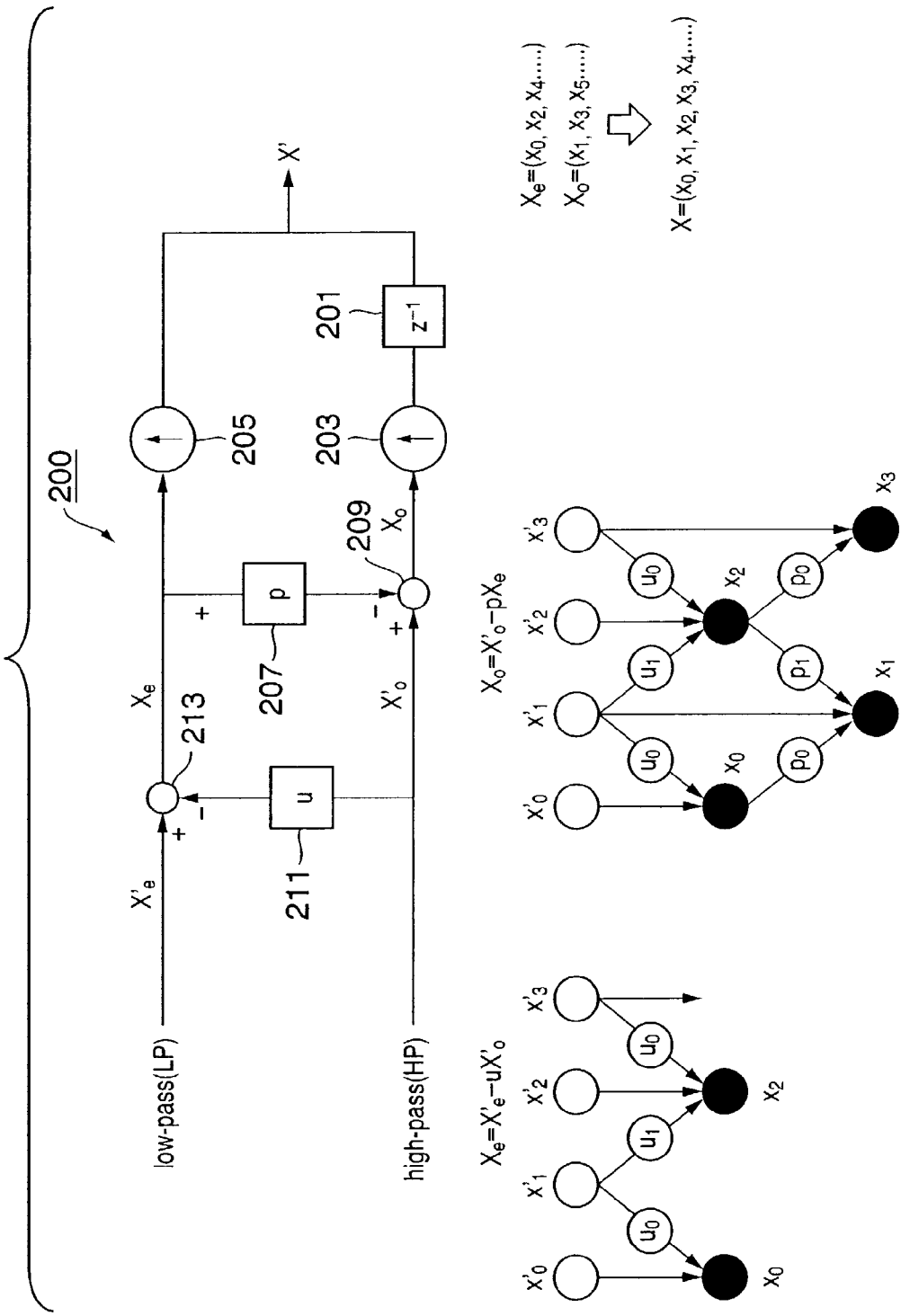
FIG. 2 is a diagram representing a reverse lifting scheme.
Figure 5:
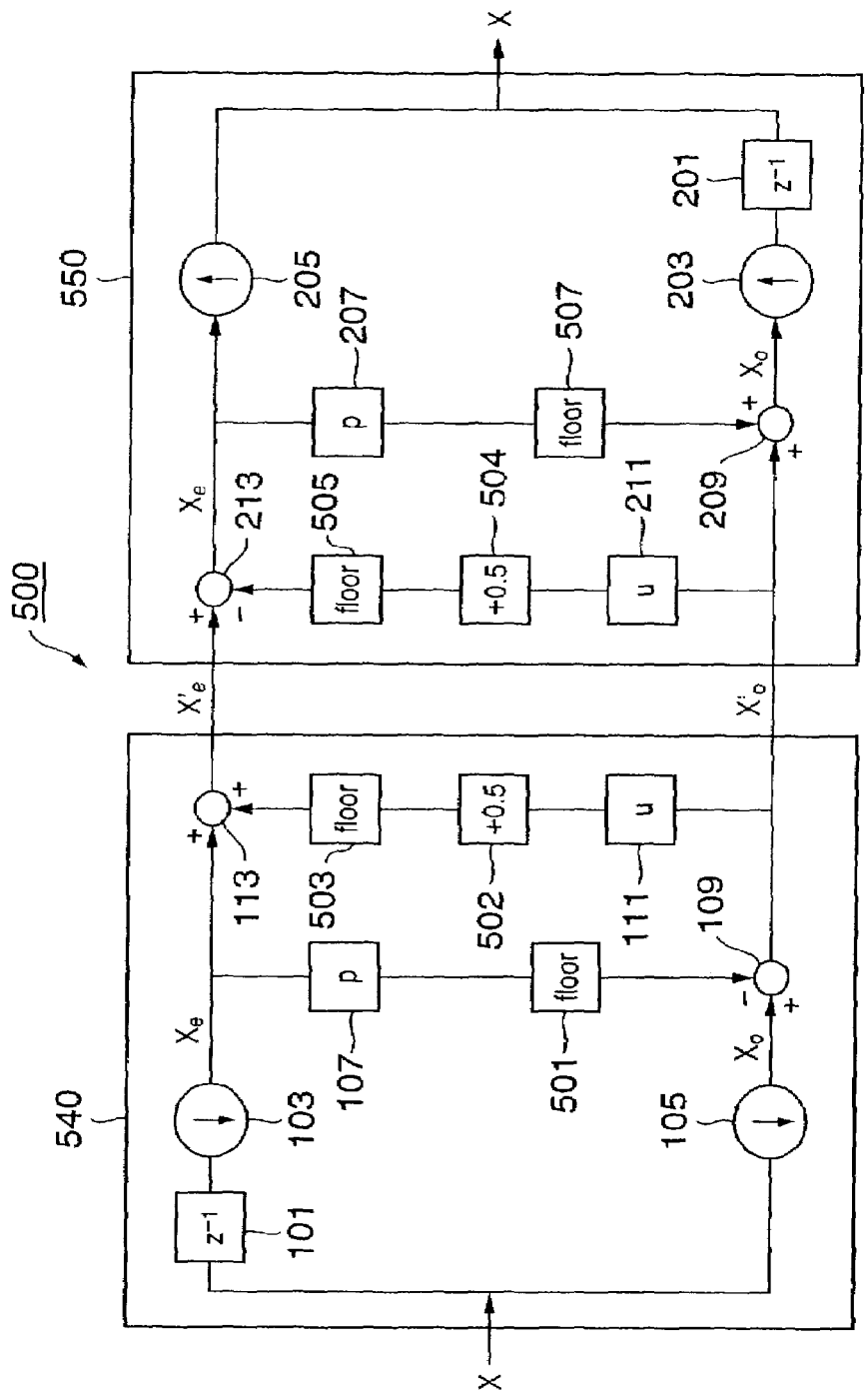
FIG. 5 is a diagram illustrating the structures of reversible forward and reverse filter processors.

FIG. 10A illustrates an arrangement obtained by deleting the delay unit and downsampling units from the forward filter processor 540 of FIG. 5 and leaving only the lifting components. If the floor-function arithmetic units 501, 503 and adder 502 are moved from the input side of the subtractor 109 and adder 113 in FIG. 10A to the output side thereof, the result will be as shown in FIG. 10B. In FIG. 10B, a ceiling-function arithmetic unit 1001 outputs the smallest integer that is equal to or greater than the input data.

When the conversion is made from FIG. 10A to FIG. 10B, the following relations are utilized:

$$N + \text{floor}(R + 0.5) = \text{floor}(N + R + 0.5) \quad (5)$$

$$N - \text{floor}(R) = \text{ceiling}(N - R) \quad (6)$$

In the above equations, N represents an integer and R a real-number value. The relations of Equations (5) and (6) can readily be understood from the subject matter described initially.

Since the element of the lifting coefficient p is $-\frac{1}{2}$, the actual real-number value in Equation (5) is such that only one bit is used below the decimal point. Accordingly, the data that enters the ceiling-function arithmetic unit is either an integer or an integer plus 0.5. In a case where the input data is an integer, the input data becomes the output data as is. In a case where the input data is an integer plus 0.5, the value obtained by adding 0.5 to this input data becomes the output data. In both cases, the result obtained by adding only the bit of the first decimal place of the input data to the input data is the same.

Accordingly, FIG. 10B can be modified in the manner shown in FIG. 10C. Here a 1-bit adder 1003 adds only the bit of the first decimal place, which is the least significant bit (LSB) of the output data of subtractor 109, to this data. The multiplier 111 multiplies the sum by the lifting coefficient and applies the distributive law, which relates to the four arithmetical operations, to the product, whereby FIG. 10C can be modified in the manner shown in FIG. 11A.

Figure 11A:
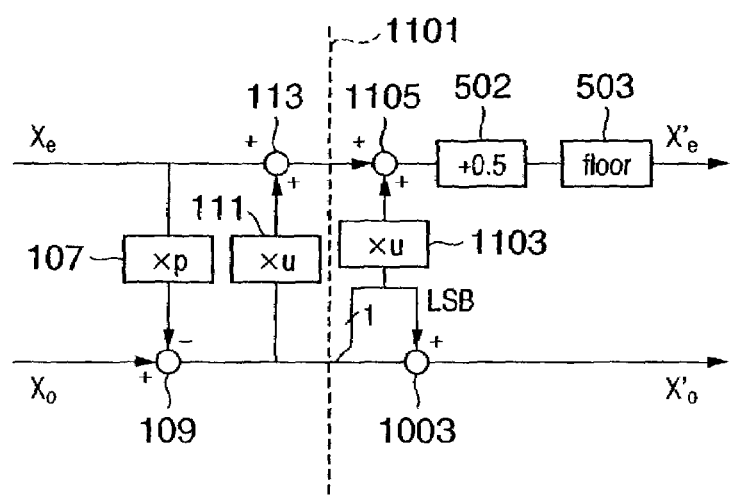
FIG. 11A is a diagram illustrating the structure of a second embodiment of the present invention.

Applying the distributive law necessitates a new multiplier 1103 and adder 1105. This multiplier and adder apply the lifting operation solely to the LSB of the output data from the subtractor 109. FIG. 11A can be separated into a real-number-type lifting unit and an arithmetic unit for integerization. The left side of dashed line 1101 is the real-number-type lifting unit and the right side is the arithmetic unit for integerization. The result of the real-number-type lifting operation is output from the subtractor 109 and adder 113 in FIG. 11A. FIG. 11A is one implementation of the second embodiment.

Even if the above-described real-number-type lifting unit is replaced by the aforementioned convolution processing unit and a transform-coefficient separation unit that divides the transform coefficients into high- and low-frequency transform coefficients, functions identical with those of FIG. 10A can be implemented. With FIG. 11A as it is, the relationship to the first embodiment is unclear. Accordingly, FIG. 11A can be modified to FIG. 11B.

An adding unit 1102 adds on 0.5 in the same manner as adder 502, and a floor-function arithmetic unit 1103 is the same as the floor-function arithmetic unit 503. In case of a real-number value that does not possess information below the second decimal place, adding the real number to the bit of the first decimal place of the real-number value is equivalent to adding 0.5 to the real-number value to find the floor function. Accordingly, the modification can be made as shown.

Figure 11B:
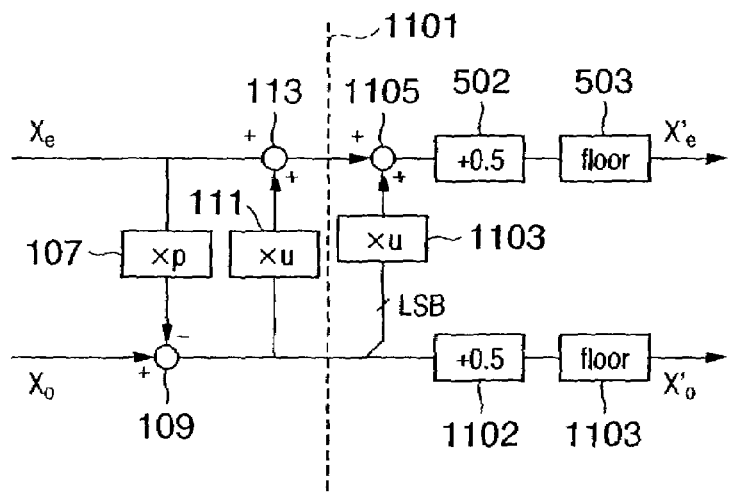
FIG. 11B is a diagram illustrating an example of a modification thereof.

The implementation of FIG. 11B can be considered to comprise a first lifting unit (the left side of the dashed line) for executing real-number-type reversible filter processing, and a second lifting unit for lifting only some of the bit data of the result of the first lifting operation.

The function of the left side of the dashed line in FIG. 11B is to perform a real-number-type 5×3 filter operation, which is the same as the function of FIG. 7 in the first embodiment. Though there is a difference in that the coefficients are output upon being split into high and low-frequency transform coefficients or the high- and low-frequency transform coefficients are output alternatingly every cycle, the output operational results are the same.

The function of the right side of the dashed line in FIG. 11B is the same as that of FIG. 9 in the first embodiment, namely to multiply the bit of the first decimal place of two high-frequency transform coefficients (real-valued) by ¼, add the product to the low-frequency transform coefficient, and then add 0.5 to the low- and high-frequency transform coefficients to find and output the floor function.

The implementation of FIG. 11B is the result of subjecting FIG. 10A, in which integer-type reversible filter processing is possible, to an equivalent modification. It goes without saying, therefore, that integer-type reversible filter processing is possible with the arrangement of FIG. 11B. Since the functions implemented by the two processing units (FIGS. 7 and 9) in the first embodiment are the same as the functions of FIG. 11B, it is thus demonstrated that integer-type reversible filter processing is possible with the first embodiment.

<Modification of FIG. 9>

Since it can be construed that the functions implemented by the two processing units (FIGS. 7 and 9) in the first embodiment are the same as the functions of FIG. 11B, FIG. 9 can be modified further to a simple arrangement.

The input data to the adding unit 819 in FIG. 9 is the result of multiplexing both items of input data applied to the two adding units 502 and 1102 in FIG. 11B. Since the input data to the adding unit 1102 is the lifting coefficient p=(−½,−½), it can readily be understood that there is only one bit below the decimal point.

However, as far as the structure of FIG. 11B is concerned, it is considered that the input to the adding unit 502 is data having 3-bit information below the decimal point. The same is true in view of the structure of FIG. 9 (if 1-bit real-number data below the decimal point is multiplied by ¼, 3-bit real-number data below the decimal point is the result).

FIG. 11B is equivalent to FIG. 10B, and the data input to the adding unit 502 is the same in both FIGS. 10B and 11B. In FIG. 10B, the sum of data, which is obtained by multiplying an integer by ¼, and the other integer is input to the adding unit 502. Hence, 2-bit data below the decimal point is obtained.

Accordingly, the bit of the third decimal place of the data input to the adding unit 502 in FIG. 11B is always "0". Even if the bit of the third decimal place is changed to "1", there is absolutely no effect upon the operational result. The reason is that discarding is always performed by the floor-function arithmetic unit 503. This means that ⅛ is allowed to be added freely in the adding unit 1105 located in front of the adding unit 502.

Consider changing the lifting coefficient regarding the bit of the first decimal place of the high-frequency transform coefficient from (¼,¼) to (¼,½) or (½,¼). In this case a problem arises when the decimal data corresponding to the coefficient ½ becomes "1". The original computational result ½ (the value of the first decimal place)×¼ (coefficient)=⅛ becomes ½×½=¼. Thus, the result becomes larger by ⅛. This is the same as adding on ⅛.

In summary, therefore, when the decimal data corresponding to the coefficient ½ is "0", the computational result is the same as that which prevailed prior to the change of coefficient. When the decimal point corresponding to the coefficient ½ is "1", the result is that ⅛ is added to the computational result which prevailed prior to the change of coefficient. Since this ⅛ is the value that is allowed to be added on freely, as mentioned above, it will be understood that the change in lifting coefficient presents no problems.

Figure 12:
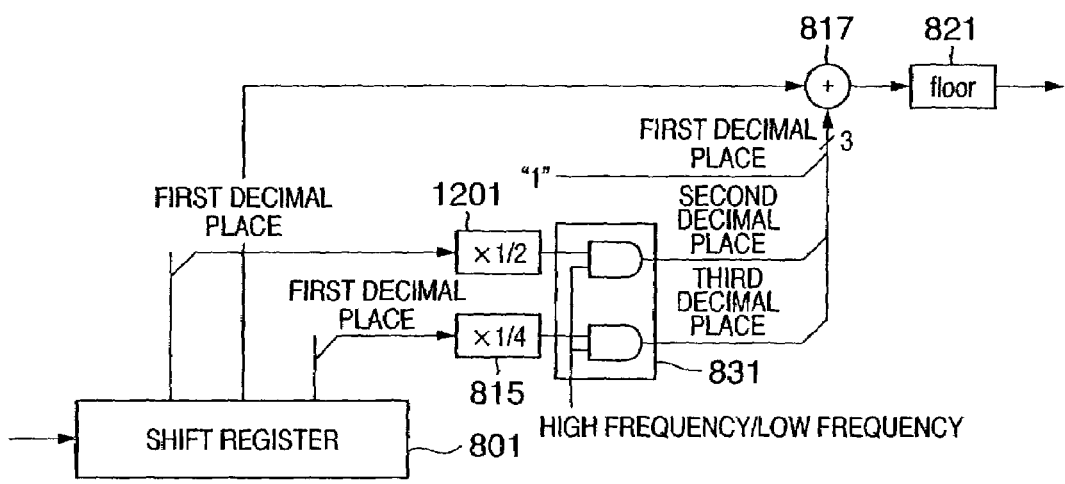
FIG. 12 is a diagram illustrating an example of a modification of the first embodiment of the invention.

Thus, FIG. 9 can be modified as shown in FIG. 12.

When the central item of data of the three items of data output from the shift register 801 is a low-frequency transform coefficient, the bit of the first decimal place of the high-frequency transform coefficient output from the left side is multiplied by ½ and the bit of the first decimal place of the high-frequency transform coefficient output from the right side is multiplied by ¼. The weightings of these differ from each other. The former is bit data of the second decimal place and the latter is bit data of the third decimal place. These two bits, therefore, are added, without use of an adder, merely by being placed side by side. This signal of two bits is input to the gate unit 831. The input signal is validated when a low-frequency transform coefficient is output and is masked and invalidated when a high-frequency transform coefficient is output. After the output of the gate unit 831 is made three bits by appending 0.5, which was added on by the adding unit 803 of FIG. 9, as the bit of the first decimal place, the output is input to the adder 817 so that it is added to the low-frequency transform coefficient (real-valued) that is output from the center of the shift register 801. The output of the adder 817 is converted to an integer by the floor-function arithmetic unit 821 and the integer is output from the floor-function arithmetic unit 821. An output result identical with that of FIG. 9 is obtained by this arrangement.

Third Embodiment

Figure 13A:
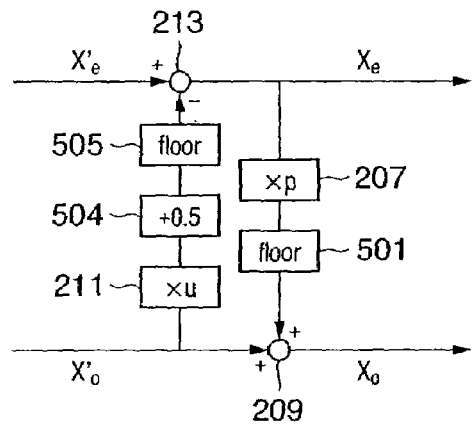
FIG. 13A is a diagram showing the structure of a lifting unit in an inverse transform filter of an integer-type reversible 5×3 filter.
Figure 13B:
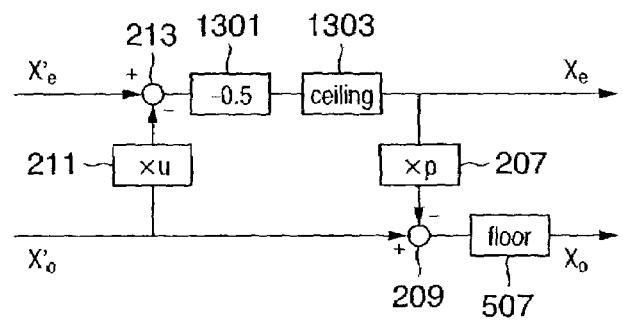
FIGS. 13B and 13C are diagrams illustrating examples of modifications equivalent to this structure.

A third embodiment illustrates an arrangement on an inverse transform side, which forms a pair with the second embodiment. Like the second embodiment, FIG. 13A illustrates an arrangement obtained by deleting the delay unit and zero-insertion unit from the forward filter processor 540 of FIG. 5 and leaving only the lifting components. If the floor-function arithmetic units 505, 507 and adding unit 504 are moved from the input side of the subtractor 213 and adder 209 in FIG. 13A to the output side thereof, the result will be as shown in FIG. 13B. In FIG. 13B, a subtracting unit 1301 subtracts 0.5 from the output of the subtractor 213. Numeral 1303 denotes a ceiling-function arithmetic unit.

When the conversion is made from FIG. 13A to FIG. 13B, the following relations are utilized:

$$N-\text{floor}(R+0.5)=\text{ceiling}[(N-R)-0.5] \quad (7)$$

$$N+\text{floor}(R)=\text{ceiling}(N+R) \quad (8)$$

In the above equations, N represents an integer and R a real-number value. It should be evident from the description thus far that relations of Equations (7) and (8) are self-evident.

Since the element of the lifting coefficient p is ¼, the real-number value in Equation (7) is such that two bits are used below the decimal point. Accordingly, if the data output from subtractor 213 is represented by a decimal part in binary notation and integer, we have any of integer plus $0.00_2$, integer plus $0.01_2$, integer plus $0.10_2$ and integer plus $0.11_2$. How the output of the subtracting unit 1301 and the decimal part output from the ceiling-function arithmetic unit 1303 change with regard to each of these outputs is indicated below for only two places of the decimal part.

| Decimal Part | | Arithmetic Unit Output | | Ceiling Function Output |
|---|---|---|---|---|
| 00 | → | 10 | → | 00 (±0.00) |
| 01 | → | 11 | → | 00 (−0.01) |
| 10 | → | 00 | → | 00 (−0.10) |
| 11 | → | 01 | → | 00 (+0.01) |

The values enclosed by the parentheses are a binary representation of values that increase or decrease by passage through the subtracting unit and ceiling-function arithmetic unit.

The increasing and decreasing values are obtained by finding the two's complement of the two bits of the decimal part of the data output from the subtractor 213 and expanding the higher order bit thereof to a sign bit. The following indicates what holds with regard to the bit patterns:

00→00 (two's complement)→000 (±0.00)

01→11 (two's complement)→111 (−0.01)

10→10 (two's complement)→110 (−0.10)

11→01 (two's complement)→001 (+0.01)

If the most significant bit of the 3-bit data expanded to the sign bit is interpreted as the sign bit and the two lower order bits are interpreted as the data of the decimal part, then this will agree with the values within the parentheses.

Accordingly, the numerical value (the increasing or decreasing value) changed by the subtracting unit 1301 and ceiling-function arithmetic unit 1303 in FIG. 13B can be generated by a two's complement operation and processing for adding on a sign bit. By adding the generated value to the output of the subtractor 213, it is possible to obtain a value the same as the output value of the ceiling-function arithmetic unit in FIG. 13B. This arrangement is shown in FIG. 13C.

Figure 13C:
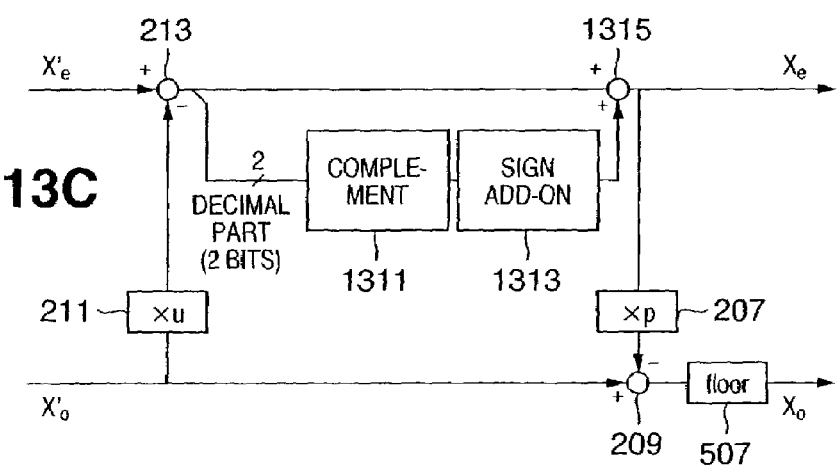

In FIG. 13C, two bits below the decimal place of the real-number value output from the subtractor 213 are input to a complementary operation unit 1311, which calculates the two's complement of these two bits. A sign-bit attaching unit 1313 attaches, as a sign bit, the higher order bit of the 2-bit data output from the complementary operation unit 1311, and an adder 1315 adds the output of the sign-bit attaching unit 1313 to the output value of the subtractor 213.

The conversion is performed in this manner to decompose the first stage of the integer-type lifting operation into a real-number-type lifting operation and a correction-value calculation. A modification is made as shown in FIG. 14A by applying the distributive law, which relates to the four arithmetical operations, between this and the next lifting operation.

Figure 14A:
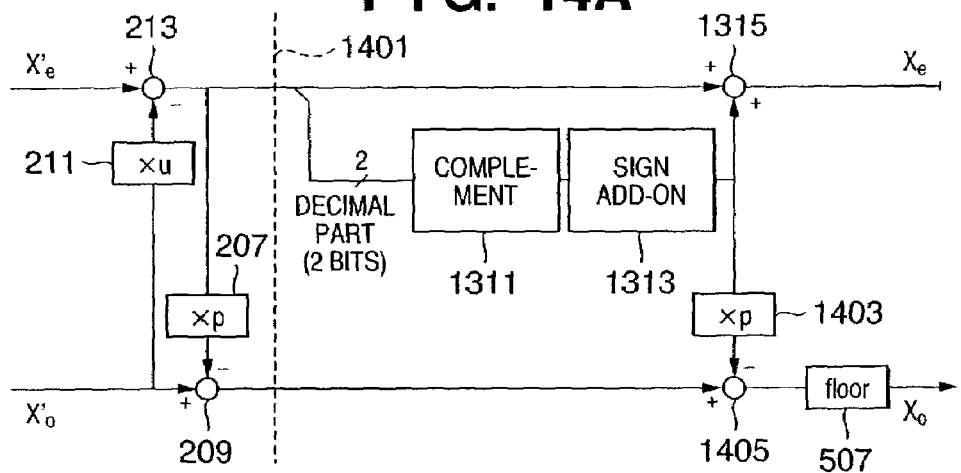
FIG. 14A is a diagram illustrating the structure of a third embodiment of the present invention.

FIG. 14A can be separated into a real-number-type lifting unit and an arithmetic unit for integerization. The left side of dashed line 1401 in FIG. 14A is the real-number-type lifting unit and the right side is the arithmetic unit for integerization. The result of the real-number-type lifting operation is output from the subtractor 213 and adder 209 in FIG. 14A.

FIG. 14A is one implementation of the third embodiment. The real-number-type lifting unit can be replaced by a filter processor that uses a convolution operation.

Figure 15A:
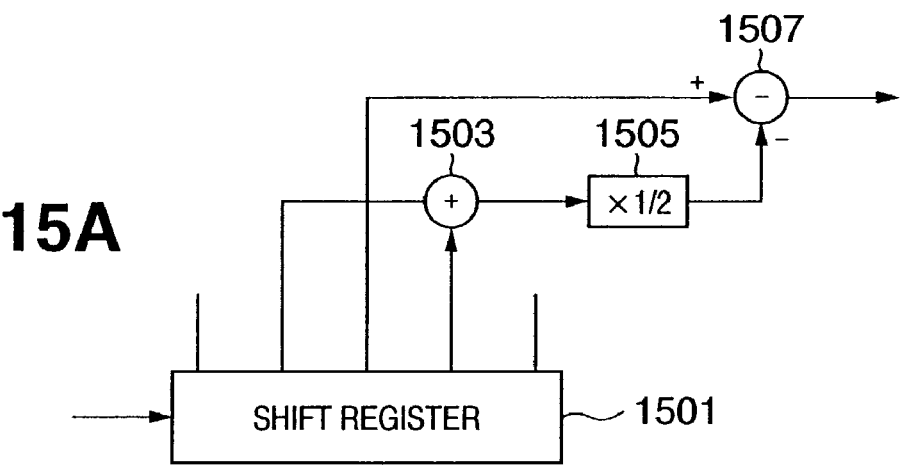
FIG. 15A is a diagram showing an implementation for performing an inverse filter operation on low-frequency transform coefficients.

The output of the adder 1315 in FIG. 15A will be considered returning to the output of the ceiling-function arithmetic unit of FIG. 13B, which is the same output value. Subtracting 0.5 from the real-number value of the two bits below the decimal point to find the ceiling function is equivalent to adding 0.25 to the real-number value to find the floor function. In both the value of the integral part is increased by one only when the decimal part is 0.75. However, if the decimal part is 0.00, 0.25 or 0.50, the value of the integral part does not change.

Figure 14B:
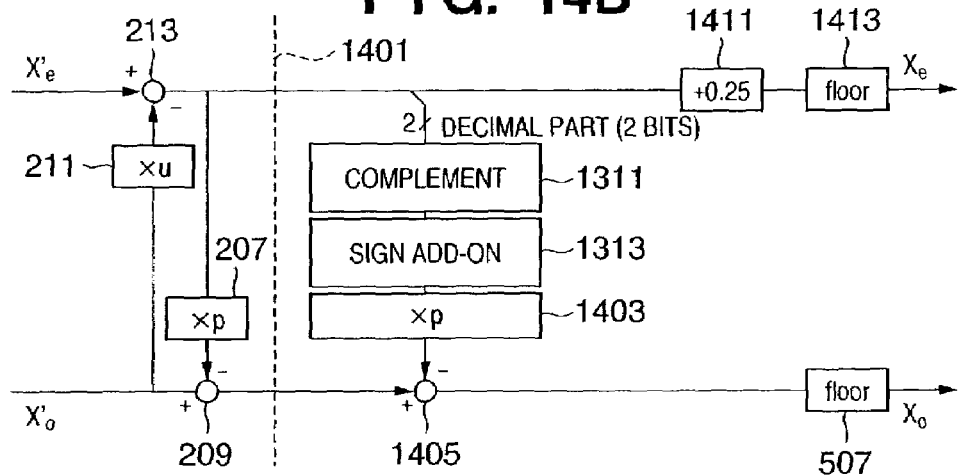
FIGS. 14B and 14C are diagrams illustrating examples of modifications thereof.

Accordingly, FIG. 14A can be modified as shown in FIG. 14B. In FIG. 14B, numeral 1411 denotes an adding unit for adding on 0.25, and 1313 denotes a floor-function arithmetic unit. In FIG. 14A, the integerizing unit cannot be construed as being a lifting implementation, but by modifying this as shown in FIG. 14B, it can be made an integerizing unit that implements a lifting operation. This also is one implementation of this embodiment.

Figure 14C:
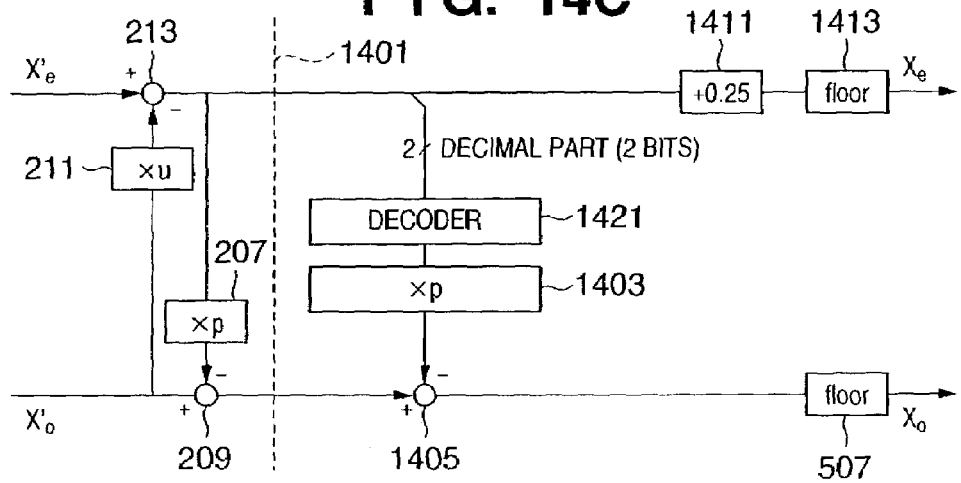

Further, the arrangement of FIG. 14C is conceivable. Here the complementary operation unit 1311 and the floor-function arithmetic unit 1313 of the integerization lifting operation are replaced by a decoder 1421 the input two which is the 2-bit data below the decimal point. The conversion function of the decoder basically is the same as the data conversion function of the complementary operation unit 1311 and floor-function arithmetic unit 1313. As described below, however, it is not necessarily required that they be the same.

As described above in connection with the arrangement of FIG. 12, there is a value that may be ignored even if it is superfluously added to a lifting adder 1405 of the integerization unit. The output of the decoder in FIG. 14C, therefore, has some degree of freedom. Specifically, since the second-stage lifting coefficient is (½,½), even if 0.375 is added superfluously, it is discarded at the time of the floor function operation and may be ignored. By utilizing such a value whose addition is allowed, it is possible to use a decoder whose input and output are as follows, which serves as one example:

| Input (2 bits) | Output Decimal Representation (Decimal Data in Binary Complementary Number Representation) |
| --- | --- |
| 00 | +0.25 (0.01) |
| 01 | −0.25 (1.11) |
| 10 | −0.25 (1.11) |
| 11 | +0.25 (0.01) |

The above output is the result of adding 0.25 (decimal representation) to a value, which is found using the above-mentioned complementary operation unit and sign-bit add-on unit, at the time of a "00" input and "10" input. The above-mentioned decoder has only two types of output values, which depend solely on the result of an exclusive-OR operation between the two input bits. This means that the decoder can be made very simple.

Fourth Embodiment

Figure 15B:
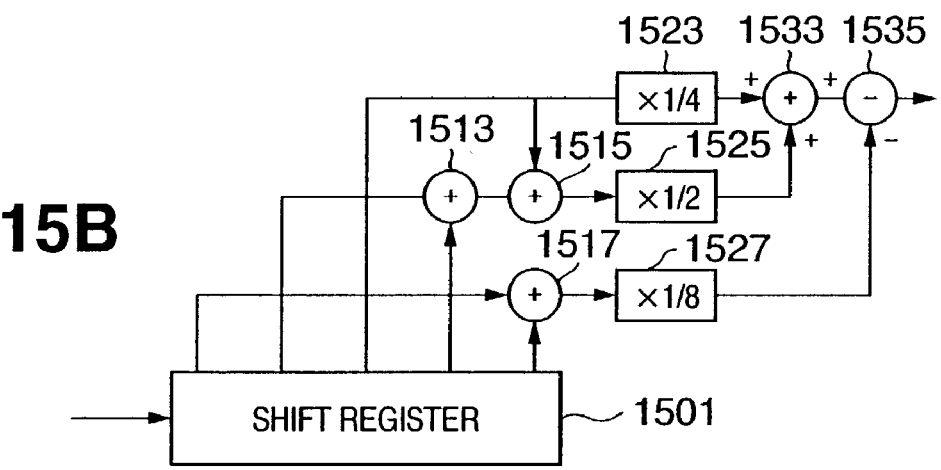
FIG. 15B is a diagram showing an implementation for performing an inverse filter operation on high-frequency transform coefficients.
Figure 16:
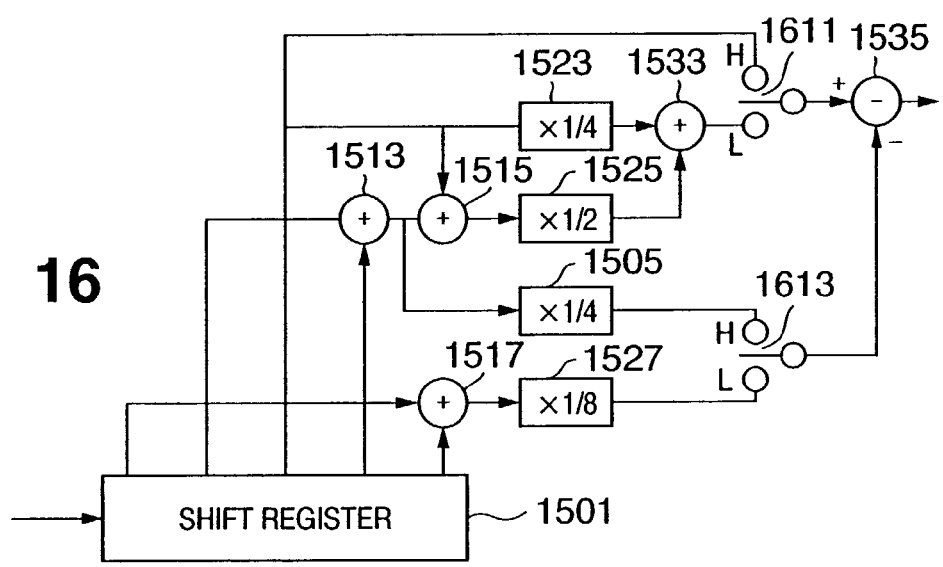
FIG. 16 is a diagram illustrating an implementation for alternately performing an inverse filter operation on low- and high-frequency transform coefficients.

A fourth embodiment illustrates an inverse-transform filter operation corresponding to the first embodiment. The filter coefficients of the inverse-transform filter are illustrated in FIG. 3. The G0-filter implementation is as shown in FIG. 15A, and the G1-filter implementation is as shown in FIG. 15B. A filter implementation realized by switching between the two filter functions of FIGS. 15A and 15B every cycle is as shown in FIG. 16. These filter implementations differ from FIGS. 6A, 6B and FIG. 7, which are the corresponding filter implementations, only in their filter coefficients, and since they operate in exactly the same manner, such operation need not be described.

Figure 17:
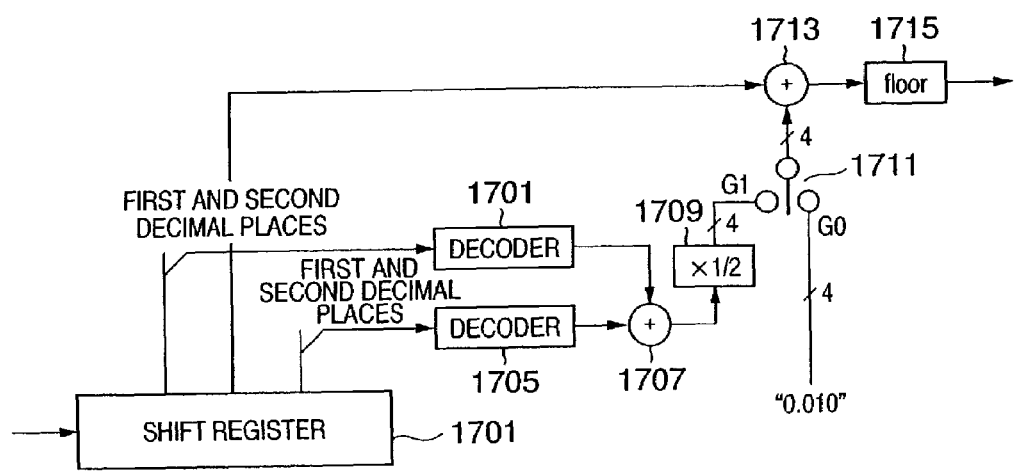
FIG. 17 is a diagram illustrating the structure of a fourth embodiment of the present invention.

The result of the inverse-transform filter operation obtained by real-number calculation using the arrangement of FIG. 16 is integerized by an integerization unit shown in FIG. 17.

In FIG. 17, a shift register 1701 is for extracting, in parallel, three items of data that have undergone real-number-type inverse-transform filter processing, decoders 1703, 1705 generate some of the correction data from 2-bit data below the decimal point, an adder 1707 adds the outputs of the two decoders 1703, 1705, and a multiplier 1709 multiplies the output of the adder 1707 by the lifting coefficient. Further, a selector 1711 selects the right side when the filter coefficient to be processed is G0 and selects the left side when the filter coefficient to be processed is G1, and an adder 1713 adds the correction data to the data that has undergone real-number-type inverse-transform filter processing. Numeral 1715 denotes a floor-function arithmetic unit.

At the time of the operation corresponding to the filter coefficient G0, 4-bit data 0.010 (0.25 in decimal representation) is selected by the selector 1711 and this data is added to the central output data of the shift register 1701 by the adder 1713.

At the time of the operation corresponding to the filter coefficient G1, the 2-bit data below the decimal point of the output data from both sides of the shift register 1701 is input to the decoders 1703, 1705 and the decoders output signed 2-bit data 0.01 or 1.11 below the decimal point. After these outputs are added together in the adder 1707, the sum is multiplied by the lifting coefficient ½ in the multiplier 1709, the product is selected by the selector 1711 and is added to the central output data of the shift register 1701 by the adder 1713.

This arrangement is the result of modifying the integerization unit of FIG. 14C having the lifting operation format to the convolution operation format. Functionally, the arrangement is the same as that of FIG. 14C. Accordingly, this arrangement naturally has the reversibility of an inverse transform possessed by the arrangement of FIG. 14C, and the numerical value output from FIG. 17 matches the original data perfectly.

Fifth Embodiment

According to the first to fourth embodiments, a real-number-type reversible filter operation is carried out, after which the result is integerized to thereby perform an integer-type reversible filter operation. According to the fifth embodiment, the integer-type reversible filter operation is performed directly without the intercession of the real-number-type reversible filter operation.

In other words, in the first to fourth embodiments, the arrangement is a cascade-connected one in which the real-number-type reversible filter is situated as a preceding stage and the converter that converts the filter output to an integer-type reversible filter is situated as a succeeding stage. By contrast, according to the fifth embodiment, the arrangement is of the parallel processing type in which correction data for integerization is generated in parallel with the operation of the real-number-type reversible filter.

Figure 18:
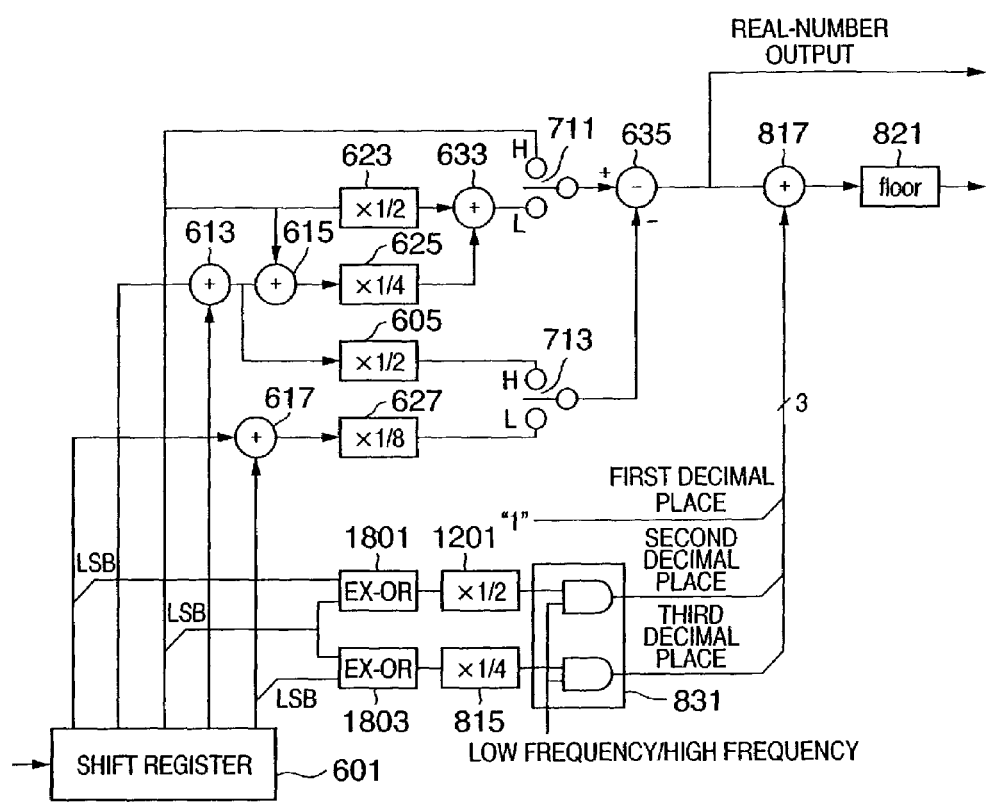
FIG. 18 is a diagram illustrating one implementation of a fifth embodiment of the present invention.
Figure 19:
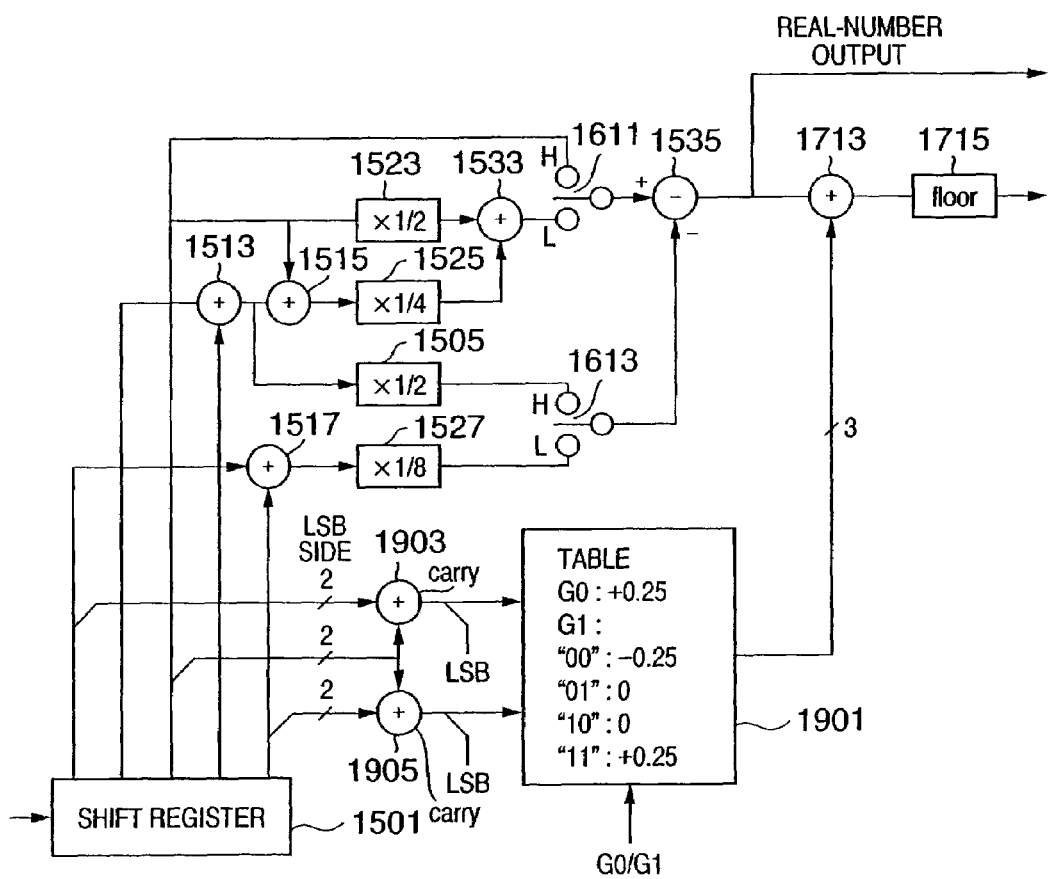
FIG. 19 is a diagram illustrating another implementation of the fifth embodiment of the present invention.

The arrangement of this embodiment is illustrated in FIGS. 18 and 19, in which FIG. 18 shows a forward-transform filter implementation and FIG. 19 a reverse-transform filter implementation.

The implementation of FIG. 18 is obtained by combining the implementation of FIG. 12 with that of FIG. 7 utilizing a certain relationship. The relationship may be stated as follows: "The bit of the first decimal place of the high-frequency transform coefficient is equal to the exclusive-OR between the LSBs of the input data (integers) on both sides of this high-frequency transform coefficient". This relationship is obvious from the defining equation of the high-frequency transform coefficient of the 5×3 filter. In FIG. 18, numerals 1801 and 1803 denote logical operation units for performing an exclusive-OR operation between the LSBS.

As a result, the above-mentioned correction data (data added in order to integerize the result of the real-number-type reversible filter operation) can be calculated directly from the input data. Implementation is achieved by a single stage, as shown in FIG. 18, and not by two stages (using two shift registers), as is done in the first embodiment.

This is none other than a method of calculating second and third decimal places of the correction data. The arrangement may be one in which a logical circuit is provided for adopting the result of the exclusive-OR between the LSBs on both sides of the shift register 601 as the third decimal place, taking the exclusive-OR between either one of these two LSBs and the LSB of the central data from the shift register 601, and making the second decimal place a "1" when the result of the exclusive-OR operation is "1" and, moreover, the third decimal place is "0". Since the correction data based upon this arrangement does not add a superfluous value, it is slightly different from the correction data of FIG. 18. Though further modifications are conceivable, these will not be described here. In other words, if attention is directed just to methods of generating correction data, any number of methods will exist.

In this arrangement also, the result of a real-number-type reversible filter operation can be obtained by extracting the output of the subtractor 635.

The implementation of FIG. 19 is obtained by combining the implementation of FIG. 17 with that of FIG. 16. Here 2-bit adders 1903, 1905 are used to calculate two sets of 2-bit decimal-point data that is input to the decoders of FIG. 17 when G1 filter processing is executed.

The 2-bit data below the decimal point of the G0 filter processing position can be calculated from two samples on both sides of the G0 filter processing position, namely from two items of lower order 2-bit data of the G1 filter processing position data. More specifically, the two's complement of a lower order 2-bit output obtained by adding the two items of lower order 2-bit data and eliminating a carry output becomes 2-bit data below the decimal point of the G0 filter processing position. Since this 2-bit data is further converted to the two's complement based upon FIGS. 14A, 14B and 14C, the original value is reconstructed. Accordingly, the lower order two bits output from the adders 1903 and 1905 become the same as the values obtained by the two's complement conversion in FIGS. 14A, 14B and 14C. The following relationships hold between the lower order two bits and the correction values (in decimal representation):

| Lower Order Two Bits | | Correction Value | | After Revision (see below) |
| --- | --- | --- | --- | --- |
| 00 | → | ±0.00 | → | +0.25 |
| 01 | → | +0.25 | → | +0.25 |
| 10 | → | −0.50 | → | −0.25 |
| 11 | → | −0.25 | → | −0.25 |

The correction value is revised within the range of values that can be added freely. Specifically, in a case where the lower order two bits are "00" and "10", 0.25 is added to each. If this is done, the correction value after revision can be decided solely by the higher order bit of the lower order two bits. That is, the correction value when the value of the higher order bit of the lower order two bits is "0" is made +0.25, and the correction value when the value of the higher order bit of the lower order two bits is "1" is made −0.25.

Accordingly, it will suffice if the inputs to the decoder 1901 are only the second bits from the LSBs excluding the carries and LSBs from the data output from the adders 1903, 1905. If a control signal representing the type (G0/G1) of filter processed also is input, the total correction data can be decoded and generated from the above-mentioned 3-bit data.

The control signal representing the filter type and the total correction data generated from the (second bit from the LSB)×2 are as follows:

| G0/G1 | (Second bit from the LSB) × 2 | Total correction data |
| --- | --- | --- |
| G0 | Arbitrary | +0.25 |
| G1 | 00 | +0.25 |
| G1 | 01 | ±0.00 |
| G1 | 10 | ±0.00 |
| G1 | 11 | −0.25 |

The above correction data becomes correction data that includes a lifting coefficient (multiplication by ½ has already been performed) because the multiplier for multiplication by the lifting coefficient downstream of the decoder is deleted. For example, if the filter type is G1 and the second bits from the LSBs are both "0", then the two correction values become +0.25. The value obtained by adding these together and multiplying by ½ is +0.25. If the floor-function value from which the decimal fraction has been eliminated is output after the total correction data is added to the output of the subtractor 1535, which is the result of filter processing of the real-number calculation, the original data that prevailed prior to the transform will be reconstructed.

The content of processing in the above-described filter processing apparatus and inverse-filter processing apparatus can be implemented even by software processing in a computer. A case in which implementation is by software processing will be described below.

Sixth Embodiment

The first to fifth embodiments relate to a hardware-implemented filter processing apparatus. An example of filter processing implemented by software will be described below.

In the prior art, it is necessary to use an integer-type lifting operation to realize integer-type reversible filter processing. According to the present invention, integer-type reversible filter processing is realized using fixed-point filter processing and integerization rounding processing, without relying upon integer-type lifting.

Figure 20:
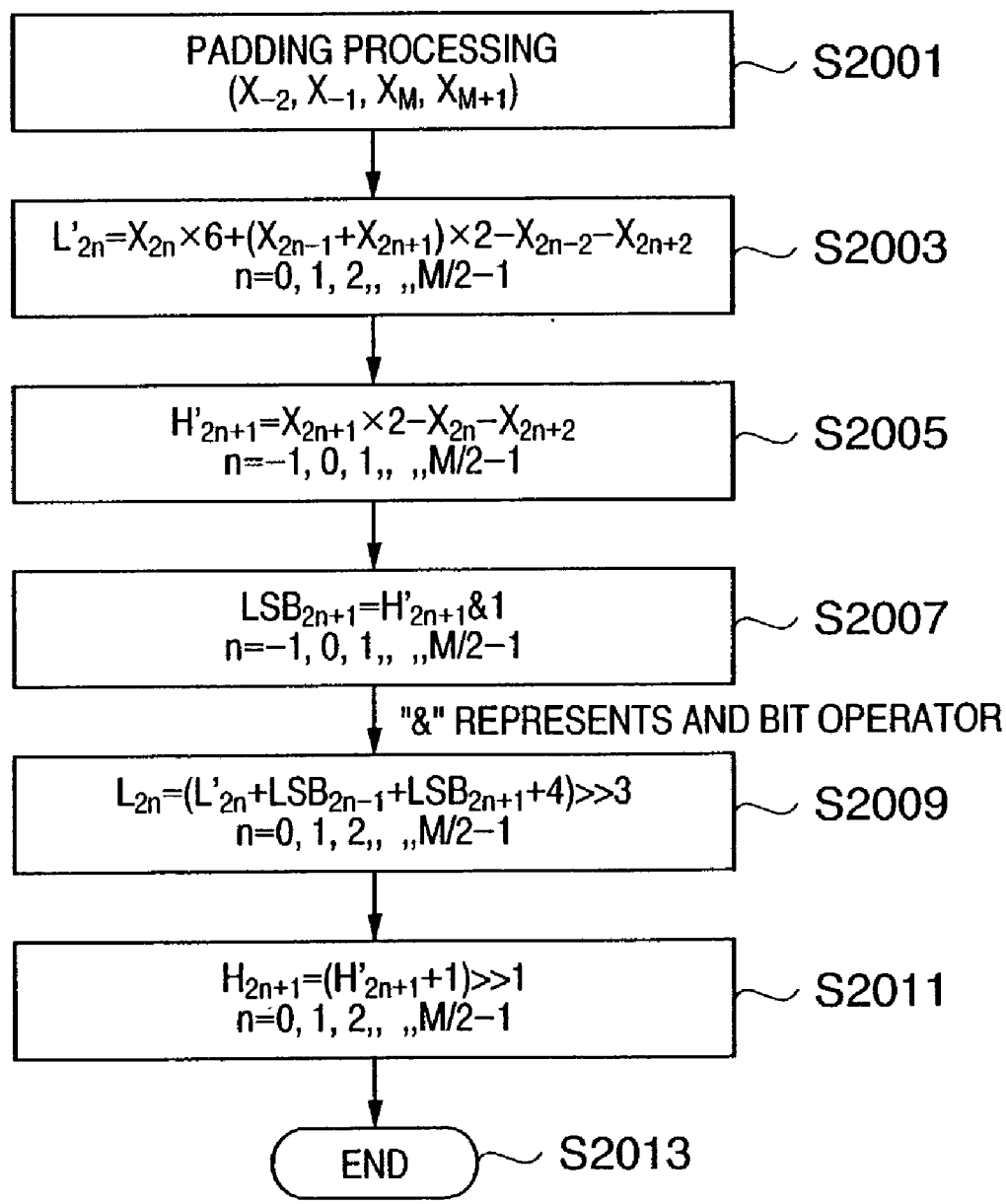
FIG. 20 is a flowchart according to a sixth embodiment of the present invention.

The flowchart depicted in FIG. 20, which uses a convolution operation as the fixed-point filter processing, is for a case where all data to be processed is processed in one batch at each step. Assume that the data processed is M-number (M is even) of data items $X_0, X_1, \ldots, X_{m-2}, X_{M-1}$.

Padding processing is executed at step 2001 in FIG. 20. Padding processing is processing that substitutes certain data for non-existent (undefined) data $X_{-2}, X_{-1}, X_M, X_{M-1}$.

According to the method generally employed, the data at both ends of all data is simply copied to expand the data, thereby generating coordinate data necessary for computation. A somewhat contrived method is to make a reflected copy (mirror image) of data at the boundaries at both ends of the data.

Next, at step 2003, low-frequency transform coefficients corresponding to data of an even-numbered sequence are subjected to a fixed-point calculation using a filter coefficient H0 shown in FIG. 3. The weighting of the LSB in this calculation is 0.125. This is followed by step 2005, at which high-frequency transform coefficients corresponding to data of an even-numbered sequence and n=−1 is likewise subjected to a fixed-point calculation using a filter coefficient H1 shown in FIG. 3. The weighting of the LSB in this calculation is 0.5.

Only the LSB data of the high-frequency transform coefficients calculated above are extracted at step 2007. At step 2009, the above-mentioned LSB data is added as correction data and 0.5 is added to effect a 3-bit shift to the right. This shift processing moves the decimal point to the right end to integerize the fixed decimal point.

Next, at step 2011, 0.5 is added to the fixed-point high-frequency transform coefficient and then 1 one-bit shift to the right is performed to achieve integerization. The low- and high-frequency transform coefficients of the integers obtained by the above calculations become the result of integer-type reversible filter processing.

Seventh Embodiment

FIG. 20 is a flowchart for a case where all data to be processed is processed in one batch at each step. The flowchart shown in FIG. 21 is for a case where the processing at each step is made solely an operation of one equation and the steps 2003 to 2011 are processed repeatedly again and again in loop fashion to thereby process all of the data.

Figure 21:
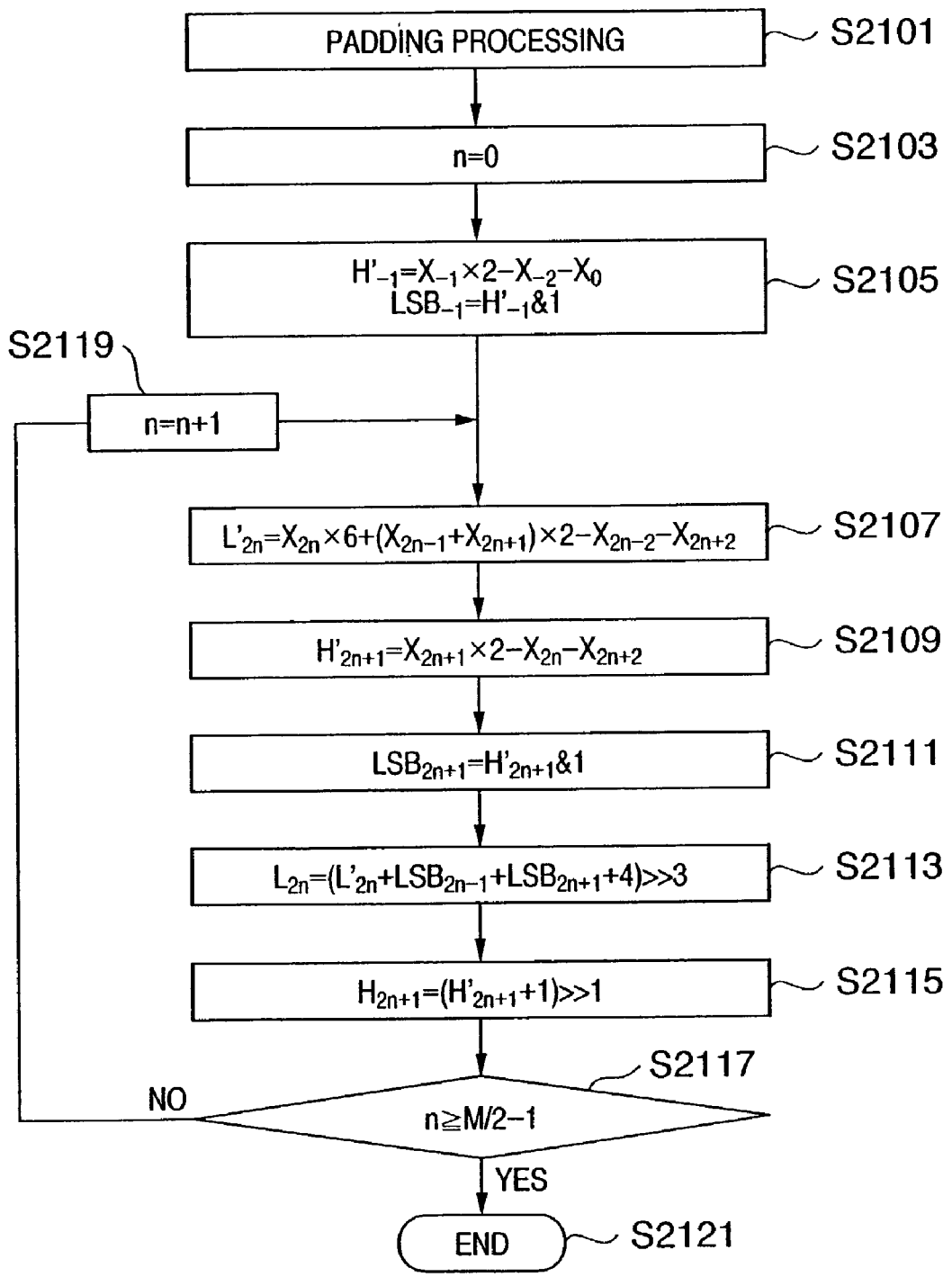
FIG. 21 is a flowchart according to a seventh embodiment of the present invention.

In FIG. 21, step 2101 performs padding processing identical with that of step 2001 in FIG. 20. Step 2103 sets n to 0 (n=0) by initialization processing. At step 2105, one of the two items of LSB data necessary to calculate the first low-frequency transform coefficient is calculated in advance.

Loop processing comprising steps 2107, 2109, 2111, 2113, 2115, 2117 and 2119 is executed from n=0 to n=M/2−1. Fixed-point calculation of low-frequency transform coefficients is performed at step 2107, fixed-point calculation of high-frequency transform coefficients is performed at step 2109, LSB data of the high-frequency transform coefficients is extracted at step 2111, the fixed-point low-frequency transform coefficients are integerized at step 2113, and the fixed-point high-frequency transform coefficients are integerized at step 2115.

Whether the transformation of all data has been completed or not is determined at step 2117 from the value of n. If the decision rendered is "NO", the value of n is increased by 1 at step 2119 and the above-described processing is repeated. If it is determined at step 2117 that the transformation of all data has been completed, then transform processing is exited (step 2121).

Eighth Embodiment

Figure 22:
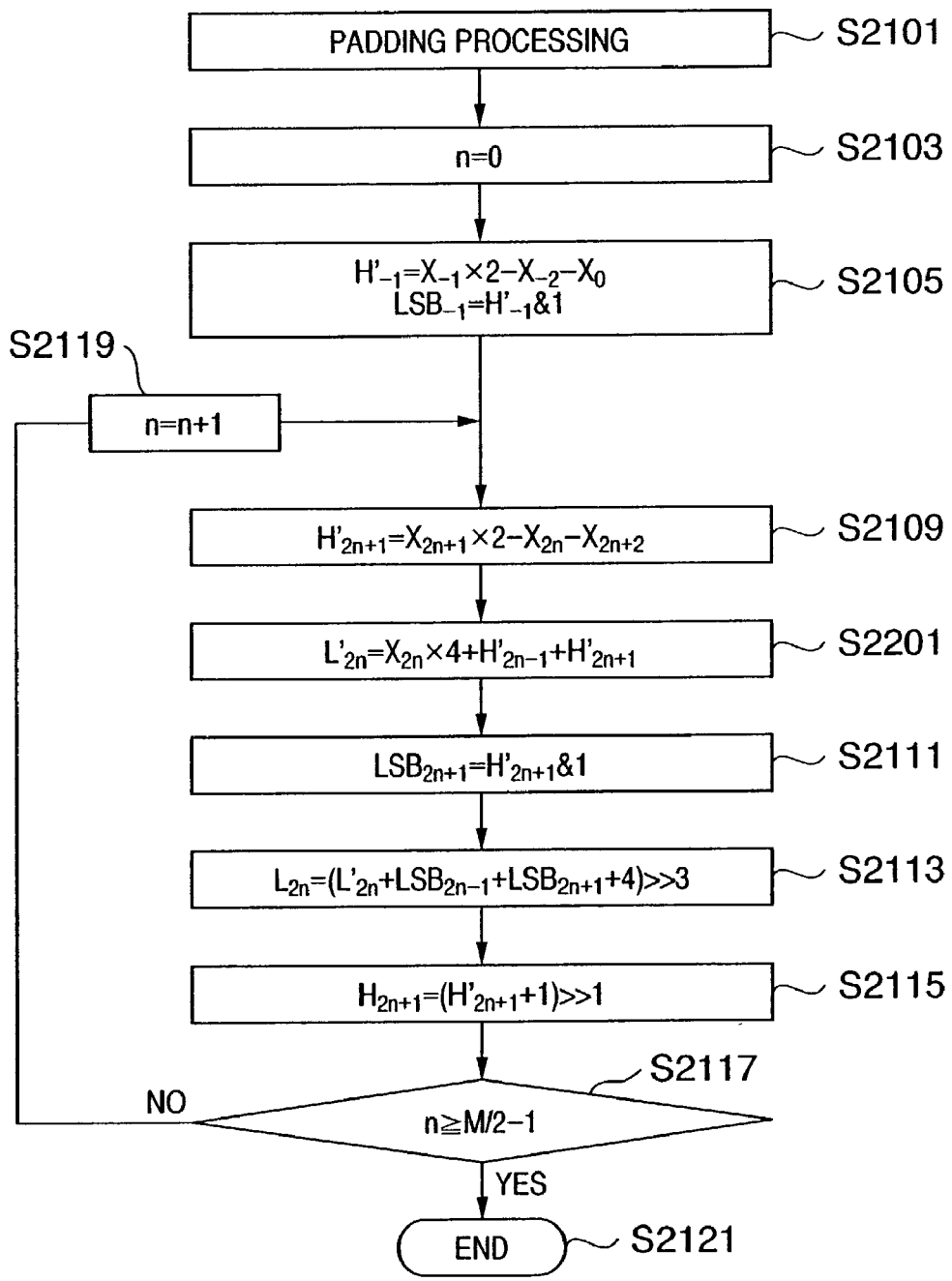
FIG. 22 is a flowchart according to an eighth embodiment of the present invention.

In the flowchart shown in FIG. 22, the fixed-point-type convolution filter processing in FIG. 21 is replaced by fixed-point-type lifting filter processing. Accordingly, the major part of the processing steps of FIG. 21 is inherited as is and only step 2107 is replaced by processing corresponding to lifting.

A new step 2201 subjects the low-frequency transform coefficients to fixed-point calculation based upon the lifting operation. Since use is made of the fixed-point high-frequency transform coefficients calculated at step 2109, the processing of step 2201 is executed after step 2109. The other processing is identical with that of FIG. 21 and need not be described again.

An arrangement in which the fixed-point-type convolution filter processing of FIG. 20 has been replaced by fixed-point-type lifting filter processing can readily be inferred. Flowcharts of various processing regarding only loop processing will be illustrated below.

Ninth Embodiment

Figure 23:
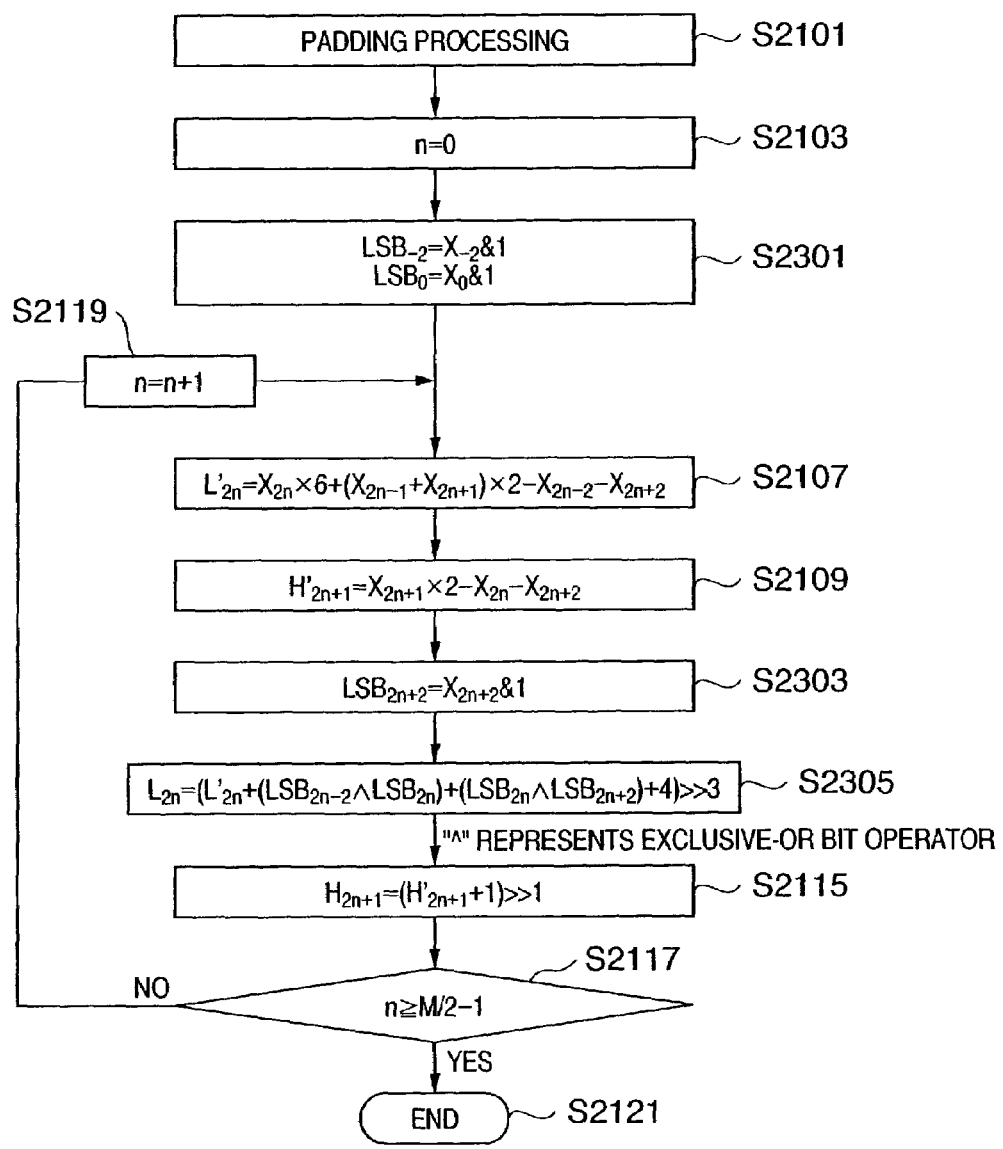
FIG. 23 is a flowchart according to a ninth embodiment of the present invention.

FIG. 23 is a flowchart for a case where fixed-point-type convolution filter processing is executed and correction data is generated based upon part of the bit information of the input data. The processing of this flowchart corresponds to the processing of FIG. 18 but differs somewhat. The difference is that the coefficients that multiply the signals output from the two exclusive-OR units in FIG. 18 are made the same coefficient value (⅛) in this flowchart.

An advantage of hardware is that by changing the multiplication coefficient, an addition operation becomes unnecessary if the bit weighting differs. Since processing increases in the case of processing by software, use is made of ⅛, which is the original multiplication coefficient.

This flowchart is largely the same as the flowchart of FIG. 21. Arithmetic steps that differ from those of FIG. 21 are three in number, namely steps 2301, 2303 and 2305, which are substituted for steps 2105, 2111 and 2113, respectively.

At step 2301, two LSBs in the even-numbered sequence of data necessary for calculating correction data are extracted in advance. A further single item of the LSB data is extracted at step 2303. At step 2305, correction data is calculated by performing an exclusive-OR operation between bits using a total of three items of LSB data, and the correction data is added to a fixed-point low-frequency transform coefficient. Two items of LSB data among the three items of LSB data used in calculating the correction data are employed also in the next processing loop. The other processing in FIG. 23 is the same as that of FIG. 21.

Tenth Embodiment

Figure 24:
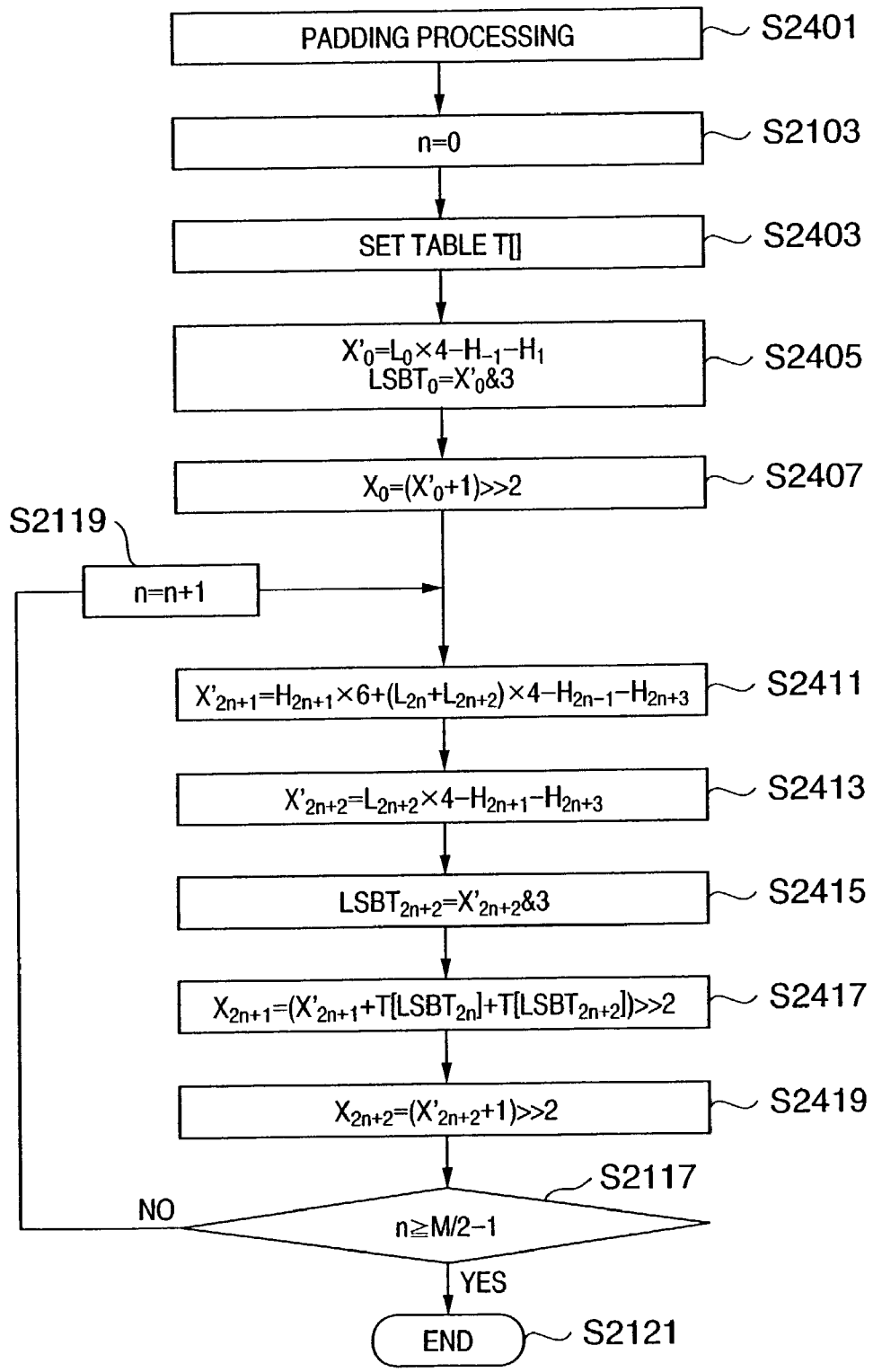
FIG. 24 is a flowchart according to a tenth embodiment of the present invention.

Inverse filter processes exist in the above-described reversible filter processing. FIG. 24 shows a flowchart of inverse filter processing corresponding to FIG. 21.

In FIG. 24, padding processing at step 2401 other transform coefficients for undefined transform coefficients $H_{-1}$, $L_M$, $H_{M+1}$. A table is set at step 2403. This table implements, by software, functions corresponding to the decoders in the fourth embodiment (FIG. 17). The lifting coefficients are multiplied in advance and values that take into consideration the decimal-point position of the fixed-point calculation are stored in the table beforehand.

At step 2405, one of two items of 2-bit data (LSBT) on the LSB side necessary to calculate the initial odd-numbered sequence samples are calculated in advance. By using results of calculation while this calculation is in progress, only $X_0$ is calculated preferentially at step 2407.

Loop processing comprising steps 2411, 2413, 2415, 2417, 2419, 2117 and 2119 is executed from n=0 to n=M/2−1. Fixed-point calculation of odd-numbered sequence samples is performed at step 2411, fixed-point calculation of even-numbered sequence samples is performed at step 2413, LSB 2-bit data of the even-numbered sequence samples are extracted at step 2415, the fixed-point odd-numbered sequence sample data is integerized using the table at step 2417, and the fixed-point even-numbered sequence sample data is integerized at step 2419.

11$^{th}$ Embodiment

Figure 25:
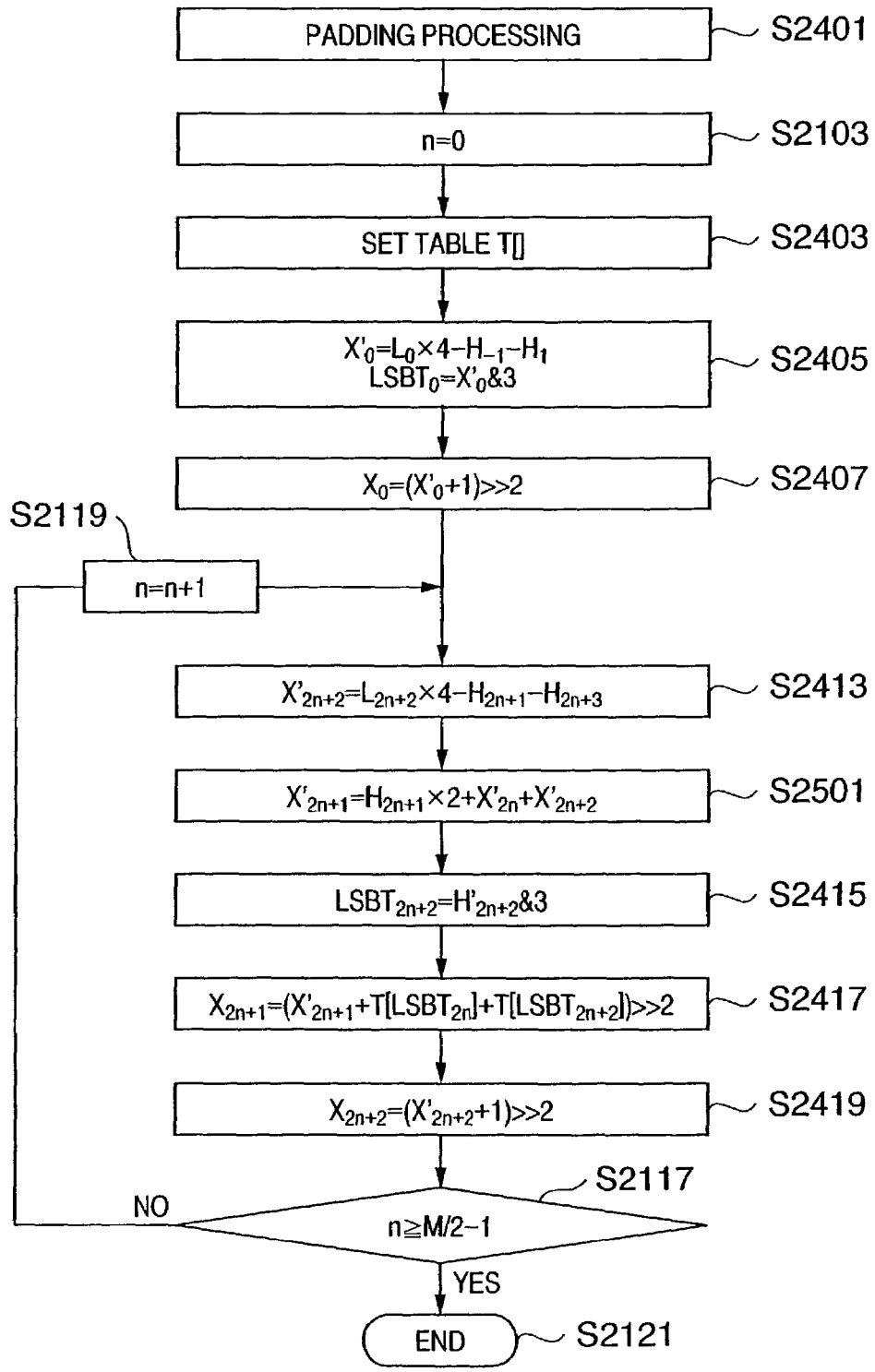
FIG. 25 is a flowchart according to an 11th embodiment of the present invention.

In the flowchart of FIG. 25, the fixed-point-type convolution filter processing in FIG. 24 is replaced by fixed-point-type lifting filter processing. Accordingly, the major part of the processing steps of FIG. 24 is inherited as is and only step 2411 is replaced by processing corresponding to lifting.

A new step 2501 subjects the odd-numbered sequence sample data to fixed-point calculation based upon the lifting operation. Since use is made of the fixed-point even-numbered sequence sample data calculated at step 2413, the processing of step 2501 is executed after step 2413. The other processing is identical with that of FIG. 24 and need not be described again.

12$^{th}$ Embodiment

Figure 26:
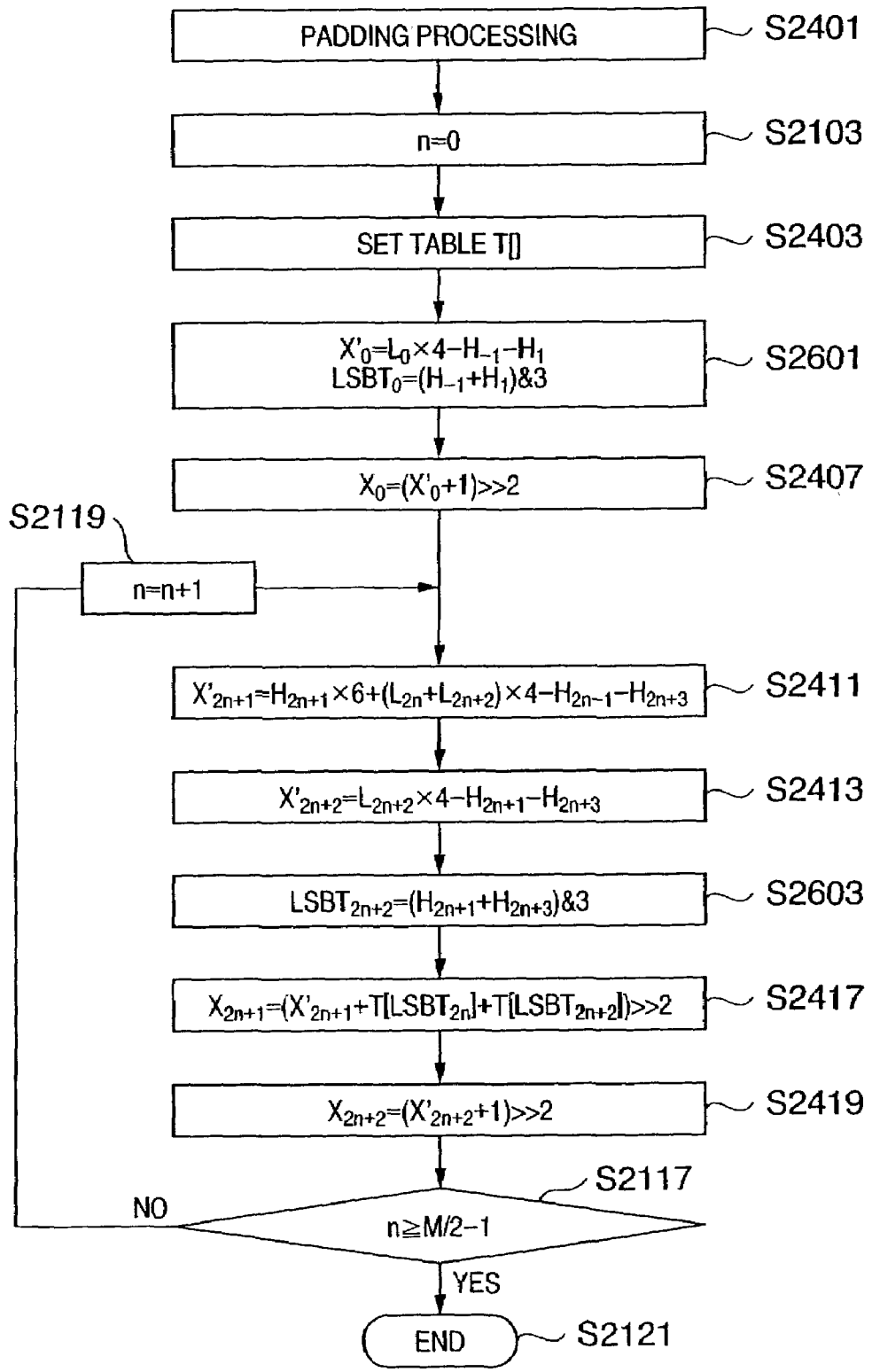
FIG. 26 is a flowchart according to a 12th embodiment of the present invention.

FIG. 26 is a flowchart for a case where fixed-point-type convolution filter processing is executed and correction data is generated based upon part of the bit information of the transform-coefficient input data. The processing of this flowchart corresponds to the processing of FIG. 19 but differs somewhat. The difference is that whereas two signals output from the two adders 1903, 1905 in FIG. 19 are input to one decoder, in this flowchart the two signals are converted independently by a table.

With hardware, processing for concatenating bits can be realized only by wiring. With software, however, it is necessary to perform an exclusive-OR bit operation by shifting bit weighting (position), and therefore the table is looked up from each of the items of 2-bit data.

Further, the content of the table in this embodiment differs slightly from the content of the tables in the 10$^{th}$ and 11$^{th}$ embodiments and the indices are related to the complements.

This flowchart is largely the same as the flowchart of FIG. 24. Arithmetic steps that differ from those of FIG. 24 are only steps 2601 and 2603, which are substituted for steps 2405 and 2415, respectively. At steps 2601 and 2603, two high-frequency transform coefficients in the input data or high-frequency transform coefficients obtained by padding processing are added to extract, by an AND-bit operation, two lower order bits of 2-bit data necessary for calculation of the correction data.

In the 6$^{th}$ to 12$^{th}$ embodiments, the description is rendered based upoin a fixed-point operation, without using a floating-point operation, so that the substance of the operation will be understood correctly. That it is possible to replace these fixed-point operations by floating-point operations may readily be deduced. In general, the problem with floating-point operations is conversion error, which occurs when data represented by a decimal in decimal representation is converted to binary representation, and accumulation of this error due to repetition of operations. In the above embodiments, such conversion error does not occur and therefore results identical with those of the fixed-point operation can be obtained.

The various filter processing apparatus and filter processing methods described above are processing with regard to one-dimensional data. However, a filter processing apparatus and filter processing method for performing two-dimensional filter processing by performing the processing twice in horizontal and vertical directions with regard to two-dimensional image data obviously fall within the scope of the present invention.

In accordance with the embodiments as described above, it is possible to realize an integer-type reversible filter processing apparatus by providing filter processing means for performing a real-number-type filter operation in which a reversible transform is possible, means for generating correction data and rounding processing means for integerization. This also makes it possible to simultaneously obtain real-number-type filter processing results and integer-type reversible filter processing results.

Further, it is possible to realize an integer-type reversible filter processing method by providing a filter processing step of performing a real-number-type filter operation in which a reversible transform is possible, a step of generating correction data and a rounding processing step for performing integerization. This also makes it possible to simultaneously obtain real-number-type filter processing results and integer-type reversible filter processing results.

Furthermore, it is possible to realize an integer-type reversible filter processing apparatus by providing first lifting operation means for performing a real-number-type filter operation in which a reversible transform is possible, and second lifting operation means for converting real-number data, which is output from the first lifting operation means, to integral data. This also makes it possible to simultaneously obtain real-number-type filter processing results and integer-type reversible filter processing results.

It is possible to realize an integer-type reversible filter processing method by providing a first lifting operation step of performing a real-number-type filter operation in which a reversible transform is possible, and a second lifting operation step of converting real-number data, which is obtained at the first lifting operation step, to integral data. This also makes it possible to simultaneously obtain real-number-type filter processing results and integer-type reversible filter processing results.

As should be evident from the description of the above embodiments, the present invention can be packaged as a computer program run by a general-purpose information processing apparatus such as a personal computer. Further, in order to install this computer program in an apparatus, a computer-readable storage medium such as a floppy disk or CD-ROM storing the program can be inserted into the apparatus and the program can be copied to or installed in the apparatus (the apparatus hard disk or the like). Accordingly, such a computer-readable storage medium also would fall within the scope of the present invention.

As described above, the present invention provides a filter processing apparatus and method applicable to a JPEG-2000-compliant wavelet transform or the like and implementable by a convolution operation while possessing reversibility.

As many apparently widely different embodiments of the present invention can be made without departing from the spirit and scope thereof, it is to be understood that the invention is not limited to the specific embodiments thereof except as defined in the appended claims.

What is claimed is:

1. A filter processing apparatus comprising:
   filter processing means for performing a real-number-type filter operation in which a reversible transform is possible; and
   rounding processing means for integerizing results of processing from said filter processing means,
   whereby integer-type filter processing in which a reversible transform is possible is implemented.

2. The apparatus according to claim 1, wherein a convolution operation is used in said filter processing means.

3. The apparatus according to claim 1, wherein a lifting operation is used in said filter processing means.

4. The apparatus according to claim 1, wherein correction data is generated in said rounding processing means based upon a part of bit information contained in the results of filter processing.

5. The apparatus according to claim 4, wherein the part of bit information contained in the results of filter processing is bit information below a decimal point.

6. The apparatus according to claim 1, wherein correction data is generated in said rounding processing means based upon a part of bit information contained in input data.

7. An inverse filter processing apparatus for reconstructing original data, from data that has undergone integer-type filter processing in which a reversible transform is possible, using filter processing means for executing real-number-type filter processing, and rounding processing means for integerizing results of processing from said filter processing means.

8. The apparatus according to claim 7, wherein a convolution operation is used in said filter processing means.

9. The apparatus according to claim 7, wherein a lifting operation is used in said filter processing means.

10. The apparatus according to claim 7, wherein correction data is generated at a rounding processing means, which is for integerizing the results of filter processing, based upon a part of bit information contained in the results of filter processing.

11. The apparatus according to claim 10, wherein the part of bit information contained in the results of filter processing is bit information below a decimal point.

12. The apparatus according to claim 7, wherein correction data is generated at a rounding processing step, which is for integerizing the results of filter processing, based upon a part of bit information contained in input data.

13. An inverse filter processing apparatus for reconstructing original data by processing data, which has undergone integer-type filter processing in which a reversible transform is possible, by first lifting operation means for executing real-number-type filter processing, and second lifting operation means for subjecting only a part of bit data contained in results of processing, which are obtained from said first lifting operation means, to lifting processing.

14. A filter processing apparatus for image data to which is input spatially neighboring data D1, D2, D3, . . . Dn, . . . expressed by integers, for performing the following calculations:

$$X_{2n} = D_{2n} + p \times (D_{2n-1} + D_{2n+1})$$

$$Y_{2n+1} = D_{2n+1} + q \times (X_{2n} + X_{2n+2})$$

where p and q represent real-number coefficients, and outputting component data X, Y obtained as a result, said apparatus comprising:
   real-number processing means for reversibly calculating $X_{2n}$ and $Y_{2n+1}$ as real numbers; and
   integerizing processing means for integerizing and outputting each of two results of processing from said real-number processing means,
   wherein integerization by said integerizing processing means acts as a rounding operation $p \times (D_{2n-1} + D_{2n+1})$ and $q \times (X_{2n} + X_{2n+2})$.

15. The apparatus according to claim 14, wherein the input data is pixel data and use is made of a 5×3 filter for a wavelet transform.

16. An image encoding apparatus comprising:
   conversion means for converting entered image data using the filter for wavelet transform set forth in claim 15;
   quantization means for quantizing the data obtained by the conversion performed by said conversion means; and
   encoding means for encoding data that has been quantized by said quantization means.

17. A computer program stored in a computer-readable medium which, when executed, performs filter processing on image data to which is input spatially neighboring data D1, D2, D3, . . . , Dn, . . . expressed by integers, for performing the following calculations:

$$X_{2n} = D_{2n} + p \times (D_{2n-1} + D_{2n+1})$$

$$Y_{2n+1} = D_{2n+1} + q \times (X_{2n} + X_{2n+2})$$

where p and q represent real-number coefficients, and outputting component data X, Y obtained as a result, said program comprising:
- program code of an input step of inputting, from a predetermined input unit, pixel data as the spatially neighboring data D1, D2, D3, ..., Dn, ... which are expressed by integers;
- program code of a real-number processing step of, using a real-number calculation unit, reversibly calculating $X_{2n}$ and $Y_{2n+1}$ as real numbers, from data inputted in the input step; and
- program code of an integerizing processing step of, using an integerizing processing unit, integerizing and outputting each of two results of processing from the real-number processing step,
- wherein integerization in the integerizing processing step acts as a rounding operation rounding $p \times (D_{2n-1}+D_{2n+1})$ and $q \times (X_{2n}+X_{2n+2})$.

18. A computer-readable storage medium storing a computer program which, when executed, performs filter processing on image data to which is input spatially neighboring data D1, D2, D3, ..., Dn, ... expressed by integers, for performing the following calculations:

$$X_{2n}=D_{2n}+p \times (D_{2n-1}+D_{2n+1})$$

$$Y_{2n+1}=D_{2n+1}+q \times (X_{2n}+X_{2n+2})$$

where p and q represent real-number coefficients, and outputting component data X, Y obtained as a result, said program comprising:
- program code of an input step of inputting, from a predetermined input unit, pixel data as the spatially neighboring data D1, D2, D3, ..., Dn, ... which are expressed by integers;
- program code of a real-number processing step of, using a real-number calculation unit, reversibly calculating $X_{2n}$ and $Y_{2n+1}$ as real numbers, from data inputted in the input step; and
- program code of an integerizing processing step of, using an integerizing processing unit, integerizing and outputting each of two results of processing from the real-number processing step,
- wherein integerization in the integerizing processing step acts as a rounding operation rounding $p \times (D_{2n-1}+D_{2n+1})$ and $q \times (X_{2n}+X_{2n+2})$.

* * * * *

UNITED STATES PATENT AND TRADEMARK OFFICE
CERTIFICATE OF CORRECTION

| | |
|---|---|
| PATENT NO. | : 7,236,997 B2 |
| APPLICATION NO. | : 10/278941 |
| DATED | : June 26, 2007 |
| INVENTOR(S) | : Tadayoshi Nakayama |

It is certified that error appears in the above-identified patent and that said Letters Patent is hereby corrected as shown below:

SHEET 30

Figure 30:
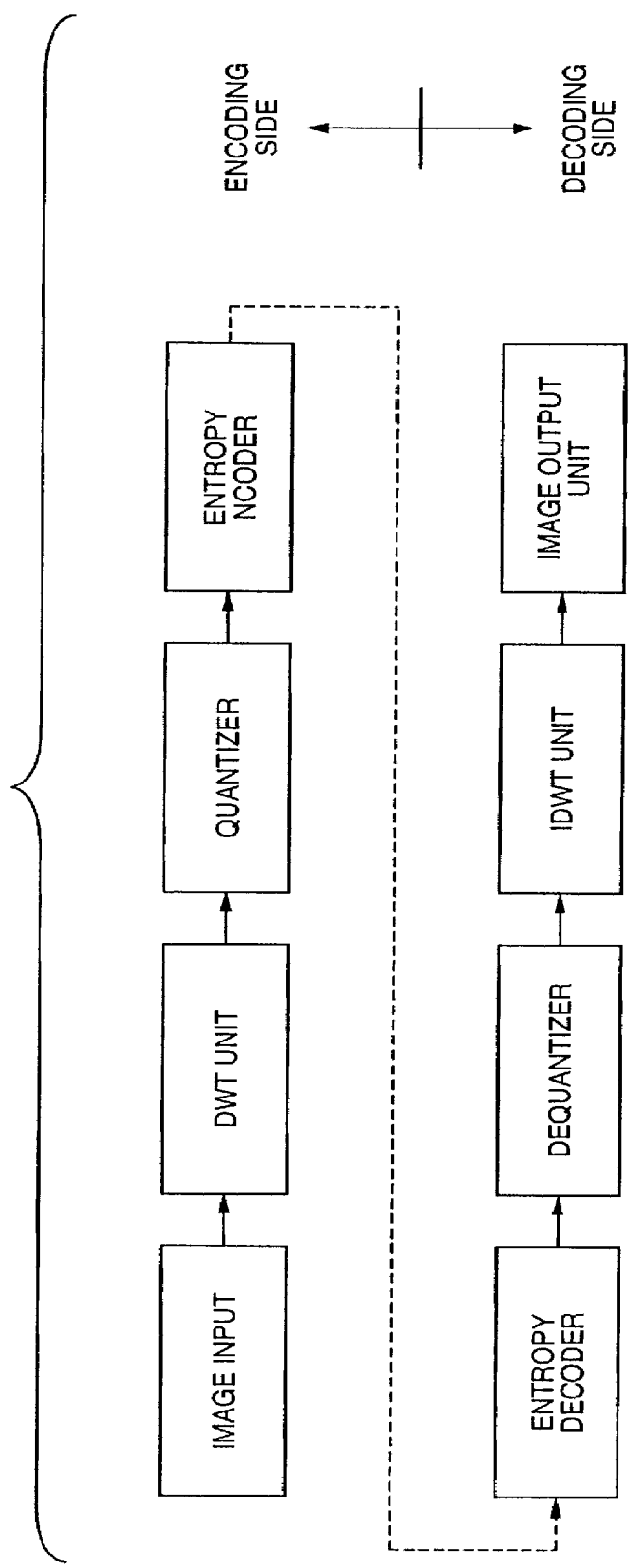
FIG. 30 is a block diagram illustrating an image encoding apparatus and an image decoding apparatus according to an embodiment of the present invention.

Figure 30, "NCODER" should read --ENCODER--.

COLUMN 1

Line 7, "a" should be deleted.

COLUMN 3

Line 62, "step" should read --steps--.

COLUMN 6

Line 17, "filter" should read --filters--.

COLUMN 19

Line 49, "LSBS." should read --LSBs.--.

COLUMN 21

Line 40, "$X_{M-1}\cdot$" should read --$X_{M+1}\cdot$--; and
    Line 50, "HO" should read --H0--.

COLUMN 23

Line 29, after "2401" insert --substitutes--.

UNITED STATES PATENT AND TRADEMARK OFFICE
CERTIFICATE OF CORRECTION

PATENT NO.        : 7,236,997 B2
APPLICATION NO.   : 10/278941
DATED             : June 26, 2007
INVENTOR(S)       : Tadayoshi Nakayama It is certified that error appears in the above-identified patent and that said Letters Patent is hereby corrected as shown below:

<u>COLUMN 24</u>

Line 31, "upoin" should read --upon--.

Signed and Sealed this

Thirtieth Day of September, 2008

JON W. DUDAS
*Director of the United States Patent and Trademark Office*